(12) United States Patent
Shimoni et al.

(10) Patent No.: US 11,098,214 B2
(45) Date of Patent: Aug. 24, 2021

(54) DYE-SUBLIMATION INKJET PRINTING FOR TEXTILE

(71) Applicant: Kornit Digital Ltd., Rosh HaAyin (IL)

(72) Inventors: Allon Shimoni, Modiin-Maccabim-Reut (IL); Jacob Mozel, Kfar-Saba (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 16/341,069

(22) PCT Filed: Oct. 30, 2017

(86) PCT No.: PCT/IL2017/051181
§ 371 (c)(1),
(2) Date: Apr. 11, 2019

(87) PCT Pub. No.: WO2018/078634
PCT Pub. Date: May 3, 2018

(65) Prior Publication Data
US 2020/0140708 A1    May 7, 2020

Related U.S. Application Data

(60) Provisional application No. 62/414,840, filed on Oct. 31, 2016.

(51) Int. Cl.
*C09D 11/328* (2014.01)
*B41M 5/00* (2006.01)
(Continued)

(52) U.S. Cl.
CPC ............. *C09D 11/328* (2013.01); *B41J 2/211* (2013.01); *B41J 2/2107* (2013.01); *B41J 2/2114* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 2,123,638 A    7/1938    Steccone
3,100,704 A    8/1963    Coles et al.
(Continued)

FOREIGN PATENT DOCUMENTS

CN    1612919    5/2005
CN    1676547    10/2005
(Continued)

OTHER PUBLICATIONS

Official Action dated Sep. 30, 2019 From the US Patent and Trademark Office Re. U.S. Appl. No. 14/619,218. (17 Pages).
(Continued)

*Primary Examiner* — Manish S Shah

(57) ABSTRACT

Provided herein is an inkjet dye-sublimation ink composition that is formulated to interact with an immobilizing composition such that the ink composition coagulates on the surface of an absorptive substrate, thereby substantially limiting soaking of the ink composition into the substrate. Also provided are a printing process and a printing machine, wherein the ink composition is directly printed on the substrate concomitantly with the immobilizing composition, and thereafter undergo heat-pressing to afford a dye-sublimation transfer of the dye to the substrate, thereby forming an image which is characterized by sharp and well defined edges of the dyed areas.

9 Claims, 4 Drawing Sheets

(51) Int. Cl.
*C09D 11/033* (2014.01)
*C09D 11/037* (2014.01)
*C09D 11/38* (2014.01)
*C09D 11/40* (2014.01)
*C09D 11/54* (2014.01)
*D06P 1/16* (2006.01)
*D06P 5/00* (2006.01)
*D06P 5/20* (2006.01)
*D06P 5/30* (2006.01)
*B41J 2/21* (2006.01)
*D06P 3/54* (2006.01)

(52) U.S. Cl.
CPC ......... *B41M 5/0023* (2013.01); *C09D 11/033* (2013.01); *C09D 11/037* (2013.01); *C09D 11/38* (2013.01); *C09D 11/40* (2013.01); *C09D 11/54* (2013.01); *D06P 1/16* (2013.01); *D06P 5/002* (2013.01); *D06P 5/2077* (2013.01); *D06P 5/30* (2013.01); *D06P 3/54* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106

See application file for complete search history.

(56) References Cited

U.S. PATENT DOCUMENTS

| | | |
|---|---|---|
| 3,968,498 A | 7/1976 | Uchiyama |
| 3,990,363 A | 11/1976 | Vertegaal |
| 4,021,591 A | 5/1977 | De Vries et al. |
| 4,284,758 A | 8/1981 | North |
| 4,285,690 A | 8/1981 | North |
| 4,296,421 A | 10/1981 | Hara et al. |
| 4,312,007 A | 1/1982 | Winfield |
| 4,345,063 A | 8/1982 | North |
| 4,380,770 A | 4/1983 | Maruyama |
| 4,435,442 A | 3/1984 | Hefele |
| 4,630,076 A | 12/1986 | Yoshimura |
| 4,702,742 A | 10/1987 | Iwata et al. |
| 4,888,093 A | 12/1989 | Dean et al. |
| 5,348,997 A | 9/1994 | Kato et al. |
| 5,349,021 A | 9/1994 | Rooney et al. |
| 5,360,933 A | 11/1994 | Imashiro et al. |
| 5,428,383 A | 6/1995 | Shields et al. |
| 5,432,229 A | 7/1995 | Aoki et al. |
| 5,501,902 A | 3/1996 | Kronzer |
| 5,510,415 A | 4/1996 | Zahrobsky et al. |
| 5,518,534 A | 5/1996 | Pearlstine et al. |
| 5,534,904 A | 7/1996 | Sheinman |
| 5,582,104 A | 12/1996 | Best et al. |
| 5,594,044 A | 1/1997 | Yang |
| 5,596,047 A | 1/1997 | Wu et al. |
| 5,631,684 A | 5/1997 | Takaide et al. |
| 5,645,888 A | 7/1997 | Titterington et al. |
| 5,757,407 A | 5/1998 | Rezanka |
| 5,798,179 A | 8/1998 | Kronzer |
| 5,820,661 A | 10/1998 | Gregory et al. |
| 5,835,116 A | 11/1998 | Sato et al. |
| 5,858,514 A | 1/1999 | Bowers |
| 5,866,638 A | 2/1999 | Shimomura |
| 5,885,335 A | 3/1999 | Adams et al. |
| 5,902,387 A | 5/1999 | Suzuki et al. |
| 5,981,113 A | 11/1999 | Christian |
| 5,988,791 A | 11/1999 | Miyashita et al. |
| 6,042,228 A | 3/2000 | Yamada et al. |
| 6,059,391 A | 5/2000 | Fulkerson et al. |
| 6,063,922 A | 5/2000 | Flood et al. |
| 6,087,061 A | 7/2000 | Hare et al. |
| 6,095,628 A | 8/2000 | Rhome |
| 6,117,921 A | 9/2000 | Ma et al. |
| 6,124,398 A | 9/2000 | Imashiro et al. |
| 6,126,281 A | 10/2000 | Shimoda et al. |
| 6,132,502 A | 10/2000 | Yatake |
| 6,140,391 A | 10/2000 | Zou et al. |
| 6,156,072 A | 12/2000 | Usui et al. |
| 6,161,929 A | 12/2000 | Erdtmann et al. |
| 6,183,079 B1 | 2/2001 | Meade et al. |
| 6,196,674 B1 | 3/2001 | Takemoto |
| 6,200,667 B1 | 3/2001 | Haruta et al. |
| 6,206,516 B1 | 3/2001 | Moriyama et al. |
| 6,262,796 B1 | 7/2001 | Loopstra et al. |
| 6,267,518 B1 | 7/2001 | Abe |
| 6,270,189 B1 | 8/2001 | Miyashita et al. |
| 6,277,183 B1 | 8/2001 | Johnson et al. |
| 6,281,269 B1 | 8/2001 | Schut |
| 6,291,023 B1 | 9/2001 | Nigam |
| 6,300,391 B2 | 10/2001 | Parazek et al. |
| 6,322,620 B1 | 11/2001 | Xiao |
| 6,326,419 B1 | 12/2001 | Smith |
| 6,335,140 B1 | 1/2002 | Miyazaki |
| 6,341,856 B1 | 1/2002 | Thompson et al. |
| 6,500,880 B1 | 3/2002 | Parazek |
| 6,416,923 B2 | 7/2002 | Miyazaki |
| 6,450,633 B1 | 9/2002 | Kronzer |
| 6,464,649 B1 | 10/2002 | Duchon et al. |
| 6,513,924 B1 | 2/2003 | Goldberg et al. |
| 6,517,199 B1 | 2/2003 | Tomioka et al. |
| 6,536,894 B1 | 3/2003 | Rasmussen |
| 6,606,427 B1 | 8/2003 | Graves et al. |
| 6,626,530 B2 | 9/2003 | Snow et al. |
| 6,647,208 B1 | 11/2003 | Kirby |
| 6,682,189 B2 | 1/2004 | May et al. |
| 6,698,874 B2 | 3/2004 | Katsuki |
| 6,755,518 B2 | 6/2004 | Codos |
| 6,785,436 B2 | 8/2004 | Ravikanth et al. |
| 6,840,992 B2 | 1/2005 | Glaum et al. |
| 6,879,378 B2 | 4/2005 | Morita et al. |
| 7,119,160 B2 | 10/2006 | Kodama et al. |
| 7,134,749 B2 | 11/2006 | Ben Zur et al. |
| 7,275,806 B2 | 10/2007 | Matsuzawa et al. |
| 7,338,988 B2 | 3/2008 | Hesler et al. |
| 7,381,347 B2 | 6/2008 | Jacobs, III et al. |
| 7,425,062 B2 | 9/2008 | Bauer |
| 7,607,745 B2 | 10/2009 | Ben-Zur |
| 7,723,400 B2 | 5/2010 | Kobayashi et al. |
| 7,748,838 B2 | 7/2010 | Oishi |
| 8,540,358 B2 | 9/2013 | Mozel et al. |
| 8,569,397 B2 | 10/2013 | Ohzeki |
| 8,926,080 B2 | 1/2015 | Mozel et al. |
| 9,340,694 B2 | 5/2016 | Oura et al. |
| 9,611,401 B2 | 4/2017 | Mozel et al. |

(56) References Cited

U.S. PATENT DOCUMENTS

| | | | |
|---|---|---|---|
| 9,616,683 | B2 | 4/2017 | Mozel et al. |
| 10,472,533 | B2 | 11/2019 | Mozel et al. |
| 2002/0009662 | A1 | 1/2002 | Miyazaki |
| 2002/0022120 | A1 | 2/2002 | Katsuki et al. |
| 2002/0044188 | A1 | 4/2002 | Codos |
| 2002/0060728 | A1 | 5/2002 | Koizumi et al. |
| 2003/0064206 | A1 | 4/2003 | Koyano et al. |
| 2003/0069329 | A1 | 4/2003 | Kubota et al. |
| 2003/0117473 | A1 | 6/2003 | Smith |
| 2003/0142167 | A1 | 7/2003 | Nakamura et al. |
| 2003/0157304 | A1 | 8/2003 | Li et al. |
| 2003/0172840 | A1 | 9/2003 | Blank et al. |
| 2003/0197750 | A1 | 10/2003 | Iwatsuki et al. |
| 2003/0197772 | A1 | 10/2003 | Iwatsuki et al. |
| 2003/0205159 | A1 | 11/2003 | McNeil |
| 2004/0024083 | A1 | 2/2004 | Lee |
| 2004/0100542 | A1 | 5/2004 | Chen et al. |
| 2004/0179077 | A1 | 9/2004 | Samii et al. |
| 2004/0252173 | A1 | 12/2004 | Ben-Zur et al. |
| 2005/0012798 | A1 | 1/2005 | Adachi |
| 2005/0098054 | A1 | 5/2005 | Berndtsson et al. |
| 2005/0174411 | A1 | 8/2005 | Adachi et al. |
| 2005/0179706 | A1 | 8/2005 | Childers |
| 2005/0179708 | A1 | 8/2005 | Ben-Zur |
| 2005/0203245 | A1 | 9/2005 | Lee et al. |
| 2005/0233097 | A1 | 10/2005 | Tojo et al. |
| 2006/0249039 | A1 | 11/2006 | Feldman et al. |
| 2006/0284929 | A1 | 12/2006 | Matsuzawa et al. |
| 2007/0103528 | A1 | 5/2007 | Pearl et al. |
| 2007/0103529 | A1 | 5/2007 | Pearl et al. |
| 2007/0104899 | A1* | 5/2007 | Pearl ............... B41J 11/002 428/32.24 |
| 2007/0148128 | A1 | 6/2007 | Kennedy et al. |
| 2007/0218222 | A1 | 9/2007 | Campbell et al. |
| 2007/0229577 | A1 | 10/2007 | Morimoto |
| 2008/0006176 | A1 | 1/2008 | Houjou |
| 2008/0012884 | A1 | 1/2008 | Ben-Zur et al. |
| 2008/0095940 | A1 | 4/2008 | Lee et al. |
| 2008/0108746 | A1 | 5/2008 | Waki et al. |
| 2008/0241397 | A1 | 10/2008 | Kato et al. |
| 2008/0241436 | A1 | 10/2008 | Kobayashi |
| 2008/0268156 | A1 | 10/2008 | Ueno et al. |
| 2009/0122127 | A1 | 5/2009 | Baker |
| 2010/0073408 | A1 | 3/2010 | Hale et al. |
| 2010/0075045 | A1 | 3/2010 | Kaimoto et al. |
| 2011/0032304 | A1* | 2/2011 | Mozel ............... C09D 11/102 347/21 |
| 2011/0079716 | A1* | 4/2011 | Ganapathiappan .. C09D 11/328 250/338.1 |
| 2011/0169901 | A1* | 7/2011 | Pinto ..................... D06P 1/54 347/101 |
| 2011/0290127 | A1 | 12/2011 | Biel et al. |
| 2012/0081477 | A1 | 4/2012 | Nagano |
| 2012/0251795 | A1 | 10/2012 | Okada et al. |
| 2013/0155162 | A1 | 6/2013 | Ohtsuka |
| 2014/0036014 | A1 | 2/2014 | Mozel et al. |
| 2015/0077488 | A1 | 3/2015 | Mozel et al. |
| 2015/0152274 | A1 | 6/2015 | Pearl et al. |
| 2015/0284905 | A1* | 10/2015 | Mozel ................ C09D 11/38 8/457 |
| 2016/0176201 | A1 | 1/2016 | Kitagawa et al. |
| 2017/0145239 | A1 | 5/2017 | Mozel et al. |
| 2019/0382608 | A1 | 12/2019 | Mozel et al. |
| 2020/0157367 | A1 | 5/2020 | Ben-Zur |
| 2020/0157371 | A1 | 5/2020 | Mozel et al. |

FOREIGN PATENT DOCUMENTS

| | | |
|---|---|---|
| CN | 1890111 | 1/2007 |
| DE | 3121043 | 3/1982 |
| EP | 0121083 | 10/1984 |
| EP | 0277361 | 8/1988 |
| EP | 709519 | 3/1996 |
| EP | 1247890 | 10/2002 |
| EP | 1281533 | 2/2003 |
| EP | 1853431 | 11/2007 |
| EP | 2166046 | 3/2010 |
| EP | 2405055 | 1/2012 |
| EP | 3184692 | 6/2017 |
| GB | 422488 | 1/1935 |
| IL | 162231 | 5/2007 |
| JP | 59-187029 | 10/1984 |
| JP | 61-075870 | 4/1986 |
| JP | 63-031593 | 6/1988 |
| JP | 05-293954 | 11/1993 |
| JP | 08-232176 | 9/1996 |
| JP | 09-039365 | 2/1997 |
| JP | 10-278379 | 10/1998 |
| JP | 11-138768 | 5/1999 |
| JP | 2002-036644 | 2/2002 |
| JP | 2002-332437 | 11/2002 |
| JP | 2003-312069 | 11/2003 |
| JP | 2004-532750 | 10/2004 |
| JP | 2005-320663 | 11/2005 |
| JP | 2010-053357 | 3/2010 |
| JP | 2012-008254 | 1/2012 |
| JP | 2017-171907 | 9/2017 |
| WO | WO 98/30749 | 7/1998 |
| WO | WO 99/56948 | 11/1999 |
| WO | WO 01/17792 | 3/2001 |
| WO | WO 01/32974 | 5/2001 |
| WO | WO 01/49504 | 7/2001 |
| WO | WO 02/066565 | 8/2002 |
| WO | WO 02/078958 | 10/2002 |
| WO | WO 03/057787 | 7/2003 |
| WO | WO 2005/076730 | 8/2005 |
| WO | WO 2005/106109 | 11/2005 |
| WO | WO 2005/115089 | 12/2005 |
| WO | WO 2005/115761 | 12/2005 |
| WO | WO 2011/018786 | 2/2011 |
| WO | WO 2011/078068 | 6/2011 |
| WO | WO 2013/046884 | 4/2013 |
| WO | WO 2015/152291 | 10/2015 |
| WO | WO 2016/027835 | 2/2016 |
| WO | WO 2017/109786 | 6/2017 |
| WO | WO 2018/07834 | 5/2018 |
| WO | WO 2019/077603 | 4/2019 |
| WO | WO 2019/077615 | 4/2019 |

OTHER PUBLICATIONS

Restriction Official Action dated Oct. 24, 2019 From the US Patent and Trademark Office Re. U.S. Appl. No. 16/558,356. (8 pages).

Advisory Action dated May 21, 2020 from the US Patent and Trademark Office Re. U.S. Appl. No. 14/619,218. (4 pages).

Final Official Action dated Apr. 15, 2020 from the US Patent and Trademark Office Re. U.S. Appl. No. 14/619,218. (16 pages).

International Preliminary Report on Patentability dated May 7, 2020 From the International Bureau of WIPO Re. Application No. PCT/IL2018/051128. (8 Pages).

International Preliminary Report on Patentability dated Apr. 30, 2020 From the International Bureau of WIPO Re. Application No. PCT/IL2018/051107. (6 Pages).

Official Action dated May 29, 2020 from the US Patent and Trademark Office Re. U.S. Appl. No. 16/774,073. (16 pages).

Supplementary European Search Report and the European Search Opinion dated Jun. 24, 2020 From the European Patent Office Re. Application No. 17865042.0. (13 Pages).

Advisory Action Before the Filing of an Appeal Brief dated Apr. 18, 2019 From the US Patent and Trademark Office Re. U.S. Appl. No. 14/619,218. (4 pages).

Advisory Action Before the Filing of an Appeal Brief dated Dec. 29, 2017 From the US Patent and Trademark Office Re. U.S. Appl. No. 14/619,218. (6 pages).

Advisory Action dated May 27, 2014 From the US Patent and Trademark Office Re. U.S. Appl. No. 13/206,646.

Applicant-Initiated Interview Summary dated Aug. 8, 2018 From the US Patent and Trademark Office Re. U.S. Appl. No. 14/619,218. (3 pages).

(56) References Cited

OTHER PUBLICATIONS

Applicant-Initiated Interview Summary dated Oct. 9, 2013 From the US Patent and Trademark Office Re. U.S. Appl. No. 12/853,361.
Applicant-Initiated Interview Summary dated Feb. 13, 2014 From the US Patent and Trademark Office Re. U.S. Appl. No. 11/606,242.
Brief Communication dated Oct. 16, 2018 From the European Patent Office Re. Application No. 05745218.7. (4 Pages).
Communication Pursuant to Article 94(3) EPC dated Oct. 10, 2014 From the European Patent Office Re. Application No. 10754998.2.
Communication Pursuant to Article 94(3) EPC dated Nov. 12, 2009 From the European Patent Office Re. Application No. 05703208.8.
Communication Pursuant to Article 94(3) EPC dated Feb. 14, 2018 From the European Patent Office Re. Application No. 10754998.2. (5 Pages).
Communication Pursuant to Article 94(3) EPC dated Oct. 17, 2017 From the European Patent Office Re. Application No. 10754998.2. (3 Pages).
Communication Pursuant to Article 94(3) EPC dated Jan. 20, 2017 From the European Patent Office Re. Application No. 05745218.7. (5 Pages).
Communication Pursuant to Article 94(3) EPC dated Aug. 21, 2017 From the European Patent Office Re. Application No. 05745218.7. (3 Pages).
Communication Pursuant to Article 94(3) EPC dated Mar. 29, 2017 From the European Patent Office Re. Application No. 10754998.2. (3 Pages).
Communication Pursuant to Rule 114(2) EPC dated Nov. 22, 2017 From the European Patent Office Re. Application No. 05745218.7. (3 Pages).
Decision to Refuse a European Patent Application dated Nov. 5. 2018 From the European Patent Office Re. Application No. 05745218. 7. (12 Pages).
Examination Report Under Sections 12 & 13 of the Patents Act, 1970 and the Patents Rules, 2003 dated Dec. 13, 2017 From the Government of India, Intellectual Property India, Patents, Designs, Trade Marks, Geographical Indications Re. Application No. 185/MUMNP/2012. (6 Pages).
Hearing Notice dated Dec. 7, 2018 From the Government of India, Patent Office, Intellectual Property Office Building Re. Application No. 185/MUMNP/2012. (3 Pages).
International Preliminary Report on Patentability dated May 9, 2019 From the International Bureau of WIPO Re. Application No. PCT/IL2017/051181. (7 Pages).
International Preliminary Report on Patentability dated Dec. 14, 2006 From the International Bureau of WIPO Re. Application No. PCT/IL /2005/000558.
International Preliminary Report on Patentability dated Jul. 17, 2007 From the International Preliminary Examining Authority Re. Application No. PCT/IL05/00166.
International Preliminary Report on Patentability dated Feb. 23, 2012 From the International Bureau of WIPO Re. Application No. PCT/IL2010/000645.
International Preliminary Report on Patentability dated Nov. 26, 2007 From the International Preliminary Examining Authority Re. Application No. PCT/IL05/00559.
International Preliminary Report on Patentability dated Feb. 8, 2007 From the International Preliminary Examining Authority Re.: Application No. PCT/IL05/00166.
International Preliminary Report on Patentability dated Nov. 29, 2011 From the International Preliminary Examining Authority Re.: Application No. PCT/IL05/00166.
International Search Report and the Written Opinion dated Jan. 8, 2019 From the International Searching Authority Re. Application No. PCT/IL2018/051107. (9 Pages).
International Search Report and the Written Opinion dated Jan. 18, 2018 From the International Searching Authority Re. Application No. PCT/IL2017/051181. (16 Pages).
International Search Report and the Written Opinion dated Dec. 21, 2010 From the International Searching Authority Re. Application No. PCT/IL2010/000645.
International Search Report and the Written Opinion dated Dec. 25, 2018 From the International Searching Authority Re. Application No. PCT/IL2018/051128. (14 Pages).
International Search Report dated Jan. 4, 2006 From the International Searching Authority Re. Application No. PCT/IL05/00559.
International Search Report dated Jan. 9, 2007 From the International Searching Authority Re. Application No. PCT/IL05/00166.
International Search Report dated Sep. 19, 2006 From the International Searching Authority Re. Application No. PCT/IL0500558.
Notification of Office Action and Search Report dated Sep. 16, 2015 From the State Intellectual Property Office of the People's Republic of China Re. Application No. 201410254004.2 and Its Translation Into English.
Notification of Office Action and Search Report dated Oct. 24, 2016 From the State Intellectual Property Office of the People's Republic of China Re. Application No. 201410254004.2 and Its Summary in English. (6 Pages).
Notification of Office Action and Search Report dated Feb. 25, 2015 From the State Intellectual Property Office of the People's Republic of China Re. Application No. 201410254004.2 and Its Translation Into English.
Notification of Office Action dated Feb. 26, 2016 From the State Intellectual Property Office of the People's Republic of China Re. Application No. 201410254004.2.
Office Action dated Jul. 3, 2006 From the Israeli Patent Office Re. Application No. 162231 and Its Translation Into English.
Office Action dated Dec. 7, 2010 From the Israel Patent Office Re. Application No. 179765 and Its Translation Into English.
Office Action dated Aug. 18, 2010 From the Israeli Patent Office Re. Application No. 163459 and Its Translation Into English.
Office Action dated Feb. 21, 2006 From the Israeli Patent Office Re. Application No. 162231 and Its Translation Into English.
Office Action dated Mar. 24, 2011 From the Israeli Patent Office Re. Application No. 177323 and Its Translation Into English.
Office Action dated Aug. 26, 2009 From the Israeli Patent Office Re. Application No. 177323 and Its Translation Into English.
Office Action dated Jul. 28, 2010 From the Israeli Patent Office Re. Application No. 177323 and Its Translation Into English.
Official Action dated Jul. 1, 2016 From the US Patent and Trademark Office Re. U.S. Appl. No. 14/619,218.
Official Action dated Feb. 2, 2017 From the US Patent and Trademark Office Re. U.S. Appl. No. 11/606,242. (11 pages).
Official Action dated Dec. 4, 2015 From the US Patent and Trademark Office Re. U.S. Appl. No. 14/619,218.
Official Action dated Dec. 6, 2010 From the US Patent and Trademark Office Re. U.S. Appl. No. 10/589,234.
Official Action dated May 7, 2009 From the US Patent and Trademark Office Re. U.S. Appl. No. 11/588,277.
Official Action dated Sep. 7, 2010 From the US Patent and Trademark Office Re. U.S. Appl. No. 10/589,234.
Official Action dated Apr. 8, 2016 From the US Patent and Trademark Office Re. U.S. Appl. No. 11/606,242.
Official Action dated Feb. 8, 2011 From the US Patent and Trademark Office Re. U.S. Appl. No. 11/606,242.
Official Action dated Oct. 8, 2015 From the US Patent and Trademark Office Re. U.S. Appl. No. 14/554,287.
Official Action dated Apr. 9, 2018 From the US Patent and Trademark Office Re. U.S. Appl. No. 11/606,242. (16 pages).
Official Action dated Apr. 9, 2019 From the US Patent and Trademark Office Re. U.S. Appl. No. 15/424,943. (16 Pages).
Official Action dated Sep. 9, 2016 From the US Patent and Trademark Office Re. U.S. Appl. No. 11/606,242.
Official Action dated Mar. 10, 2006 From the US Patent and Trademark Office Re. U.S. Appl. No. 10/461,414.
Official Action dated Aug. 11, 2017 From the US Patent and Trademark Office Re. U.S. Appl. No. 11/606,242. (16 pages).
Official Action dated Jun. 11, 2014 From the US Patent and Trademark Office Re. U.S. Appl. No. 12/853,361.
Official Action dated May 11, 2007 From the US Patent and Trademark Office Re. U.S. Appl. No. 10/776,163.
Official Action dated Feb. 12, 2008 From the US Patent and Trademark Office Re. U.S. Appl. No. 10/776,163.

(56) References Cited

OTHER PUBLICATIONS

Official Action dated Jul. 12, 2013 From the US Patent and Trademark Office Re. U.S. Appl. No. 11/606,242.
Official Action dated Mar. 12, 2012 From the US Patent and Trademark Office Re. U.S. Appl. No. 12/853,369.
Official Action dated Jul. 14, 2016 From the US Patent and Trademark Office Re. U.S. Appl. No. 13/975,399.
Official Action dated May 14, 2009 From the US Patent and Trademark Office Re. U.S. Appl. No. 11/606,242.
Official Action dated May 14, 2012 From the US Patent and Trademark Office Re. U.S. Appl. No. 12/853,361.
Official Action dated Jan. 15, 2013 From the US Patent and Trademark Office Re. U.S. Appl. No. 12/853,361.
Official Action dated Jul. 15, 2016 From the US Patent and Trademark Office Re. U.S. Appl. No. 14/554,287.
Official Action dated Nov. 15, 2013 From the US Patent and Trademark Office Re. U.S. Appl. No. 12/853,361.
Official Action dated Jul. 17, 2008 From the US Patent and Trademark Office Re. U.S. Appl. No. 11/606,154.
Official Action dated Jul. 17, 2008 From US Patent and Trademark Office Re. U.S. Appl. No. 11/606,154.
Official Action dated May 17, 2018 From the US Patent and Trademark Office Re. U.S. Appl. No. 14/619,218. (21 pages).
Official Action dated Jul. 18, 2014 From the US Patent and Trademark Office Re. U.S. Appl. No. 11/606,242.
Official Action dated Jun. 18, 2013 From the US Patent and Trademark Office Re. U.S. Appl. No. 12/853,361.
Official Action dated Mar. 18, 2015 From the US Patent and Trademark Office Re. U.S. Appl. No. 11/606,242.
Official Action dated Feb. 19, 2014 From the US Patent and Trademark Office Re. U.S. Appl. No. 13/206,646.
Official Action dated Nov. 19, 2007 From the US Patent and Trademark Office Re. U.S. Appl. No. 10/776,163.
Official Action dated Oct. 19, 2010 From US Patent and Trademark Office Re. U.S. Appl. No. 90/009,646.
Official Action dated Aug. 20, 2008 From the US Patent and Trademark Office Re. U.S. Appl. No. 10/776,163.
Official Action dated Dec. 20, 2012 From the US Patent and Trademark Office Re. U.S. Appl. No. 12/853,389.
Official Action dated Aug. 21, 2012 From the US Patent and Trademark Office Re. U.S. Appl. No. 12/853,361.
Official Action dated Apr. 22, 2010 From the US Patent and Trademark Office Re. U.S. Appl. No. 90/009,646.
Official Action dated Nov. 22, 2016 From the US Patent and Trademark Office Re. U.S. Appl. No. 13/975,399. (15 pages).
Official Action dated Aug. 23, 2011 From the US Patent and Trademark Office Re. U.S. Appl. No. 11/606,242.
Official Action dated Feb. 23, 2017 From the US Patent and Trademark Office Re. U.S. Appl. No. 14/619,218. (16 pages).
Official Action dated May 23, 2012 From the US Patent and Trademark Office Re. U.S. Appl. No. 11/606,242.
Official Action dated Jan. 25, 2007 From the US Patent and Trademark Office Re. U.S. Appl. No. 10/776,163.
Official Action dated Feb. 26, 2009 From the United States Patent and Trademark Office Re. U.S. Appl. No. 10/776,163.
Official Action dated Jan. 26, 2010 From the US Patent and Trademark Office Re. U.S. Appl. No. 90/009,646.
Official Action dated Jul. 27, 2009 From the US Patent and Trademark Office Re. U.S. Appl. No. 11/606,242.
Official Action dated Jul. 29, 2013 From the US Patent and Trademark Office Re. U.S. Appl. No. 13/206,646.
Official Action dated Aug. 30, 2017 From the US Patent and Trademark Office Re. U.S. Appl. No. 14/619,218. (19 pages).
Official Action dated Jan. 30, 2019 From the US Patent and Trademark Office Re. U.S. Appl. No. 14/619,218. (24 pages).
Official Action dated Jun. 30, 2006 From the US Patent and Trademark Office Re. U.S. Appl. No. 10/776,163.
Official Action dated Nov. 30, 2012 From the US Patent and Trademark Office Re. U.S. Appl. No. 11/606,242.
Official Action dated Nov. 30, 2018 From the US Patent and Trademark Office Re. U.S. Appl. No. 15/424,943. (56 pages).
Official Action dated Mar. 31, 2009 From the US Patent and Trademark Office Re. U.S. Appl. No. 11/606,154.
Official Action dated Mar. 31, 2010 From the US Patent and Trademark Office Re. U.S. Appl. No. 11/606,242.
Provision of the Minutes in Accordance With Rule 124(4) EPC dated Nov. 5, 2018 From the European Patent Office Re. Application No. 05745218.7. (22 Pages).
Restriction Official Action dated Apr. 3, 2012 From the US Patent and Trademark Office Re. U.S. Appl. No. 12/853,361.
Restriction Official Action dated Aug. 6, 2012 From the US Patent and Trademark Office Re. U.S. Appl. No. 12/853,389.
Restriction Official Action dated Sep. 13, 2018 From the US Patent and Trademark Office Re. U.S. Appl. No. 15/424,943. (8 pages).
Restriction Official Action dated May 14, 2013 From the US Patent and Trademark Office Re. U.S. Appl. No. 13/206,646.
Restriction Official Action dated Jan. 29, 2016 From the US Patent and Trademark Office Re. U.S. Appl. No. 13/975,399.
Summons to Attend Oral Proceedings Pursuant to Rule 115(1) EPC Dated Jan. 30, 2018 From the European Patent Office Re. Application No. 05745218.7. (7 Pages).
Supplementary European Search Report dated Apr. 9, 2015 From the European Patent Office Re. Application No. 05745218.7.
Supplementary European Search Report dated Aug. 26, 2009 From the European Patent Office Re. Application No. 05703208.8.
Supplementary European Search Report dated Jun. 29, 2009 From the European Patent Office Re. Application No. 05744201.4.
Third Party Request for Ex Parte Reexamination Dated Nov. 30, 2009 From the US Patent and Trademark Office Re. U.S. Pat. No. 7,134,749.
Translation dated Mar. 9, 2016 of Notification of Office Action dated Feb. 26, 2016 From the State Intellectual Property Office of the People's Republic of China Re. Application No. 201410254004.2.
Translation of Notice of Reason for Rejection dated Jun. 17, 2011 From the Japanese Patent Office Re. Application No. 2007-514324.
Translation of Notice of Reason for Rejection dated Nov. 18, 2011 From the Japanese Patent Office Re. Application No. 2007-514324.
Translation of Notice of Reason for Rejection dated Sep. 28, 2010 From the Japanese Patent Office Re. Application No. 2006-552776.
Translation of Notification of Office Action dated Jul. 29, 2013 From the State Intellectual Property Office of the People's Republic of China Re. Application No. 201080045541.6.
Translation of Search Report dated Jul. 29, 2013 From the State Intellectual Property Office of the People's Republic of China Re. Application No. 201080045541.6.
Written Opinion dated Jan. 4, 2006 From the International Searching Authority Re. Application No. PCT/IL05/00559.
Written Opinion dated Jan. 9, 2007 From the International Searching Authority Re. Application No. PCT/IL05/00166.
Written Opinion dated Sep. 19, 2006 From the International Searching Authority Re. Application No. PCT/IL0500558.
BASF Corporation "HPD User's Guide, Stronger Inks for a More Colorful World", 2013.
Kessel et al. "The Diacetone Acrylamide Crosslinking Reaction and Its Influence on the Film Formation of an Acrylic Latex", Journal of Coatings Technology and Research, 5(3): 285-297, Sep. 2008.
Riesen et al. "The Glass Transition Temperature Measured by Different TA Techniques. Part 2: Determination of Glass Transition Temperatures", Mettler Toledo, UserCom, XP007918757, p. 1-20, Feb. 2003.
Wikipedia "Boehmite", Wikipedia, the Free Encyclopedia, Retrieved From the Internet, Dec. 11, 2007.
Official Action dated Nov. 27, 2019 From the US Patent and Trademark Office Re. U.S. Appl. No. 16/558,356. (22 pages).
Official Action dated Jun. 5, 2020 from the US Patent and Trademark Office Re. U.S. Appl. No. 16/744,833. (44 Pages).
Interview Summary dated Dec. 7, 2020 from the US Patent and Trademark Office Re. U.S. Appl. No. 14/619,218. (3 pages).
Geckeler et al. "Carbon Nanotubes: Are They Dispersed or Dissolved in Liquids?" Nanosclae Research Letters 6:136, 3 pages, 2011.

(56) References Cited

OTHER PUBLICATIONS

Interview Summary dated Jan. 14, 2021 from the US Patent and Trademark Office Re. U.S. Appl. No. 16/774,073. (2 pages).
Official Action dated Dec. 4, 2020 From the US Patent and Trademark Office Re. U.S. Appl. No. 16/774,073. (99 Pages).
Final Official Action dated Jan. 15, 2021 from the US Patent and Trademark Office Re. U.S. Appl. No. 16/744,833. (52 pages).
Official Action dated Sep. 24, 2020 from the US Patent and Trademark Office Re. U.S. Appl. No. 14/619,218. (20 pages).

* cited by examiner

DYE-SUBLIMATION INKJET PRINTING FOR TEXTILE

RELATED APPLICATIONS

This application is a National Phase of PCT Patent Application No. PCT/IL2017/051181 having International filing date of Oct. 30, 2017, which claims the benefit of priority under 35 USC § 119(e) of U.S. Provisional Patent Application No. 62/414,840 filed on Oct. 31, 2016. The contents of the above applications are all incorporated by reference as if fully set forth herein in their entirety.

FIELD AND BACKGROUND OF THE INVENTION

The present invention, in some embodiments thereof, relates to textile printing and, more particularly, but not exclusively, to printing of dye-sublimation ink compositions directly onto absorptive substrates.

Presently known methods of dying fabrics using dye-sublimation utilize special heat-sensitive dyes to first print the desired designs, graphics, text, or other images onto special transfer paper, referred to as transfer medium. The surface of the transfer medium onto which the patterns have been printed is then placed into direct content with the fabric, and the paper and the fabric are placed together into a heat press. The heat imparted by the heat press heats the transfer medium and the fabric to approximately 200° C., causing the image on the transfer medium to be transferred to the fabric by sublimation. Specifically, the heat press subjects the transfer medium to such a high temperature that the solid dye disposed on the transfer medium vaporizes into a gas directly from its solid state. The high temperature also serves to open the pores and loosen the fibers of the fabric and allow the dye molecules to enter the fabric's material that directly in contact with the transfer medium. As the temperature within the heat press cools, or when the fabric is removes from the heat press, the fibers close and the gas of dye molecules reverts to a solid state, trapping the dye in the pores of the fabric fiber. Thus, the fabric contains a mirror image of the pattern previously disposed on the transfer medium.

The need to use a transfer medium complicates the process, and limits the usability of this process for various reasons. For example, a dye-sublimation process relies inter alia on the heat press and the contact between the transfer medium and the fabric. If there are gaps in the contact between the transfer paper and the fabric, the vaporized dye will be able to move about in the gap and will not be forced to enter the fabric in the same location and configuration that it had on the transfer medium. Because good contact between the transfer paper and the fabric is critical to achieve the desired dye transfer and print quality using dye-sublimation, dye-sublimation processes are not suitable for printing on certain garments' surfaces which are not sufficiently flat or pressable to allow uniform direct contact between the transfer medium and the garment.

The dependency on a transfer medium suffers from other limitations stemming from uneven sublimation and absorption properties of various dye substances, and also limits the use of dye-sublimation techniques in roll-to-roll systems.

Inkjet techniques are used in dye-sublimation printing, but are limited to indirect printing of images on transfer media (a sheet recording medium), or for printing on pre-treated substrates. Other dye-sublimation printing methods involve an agent treatment layer that is formed in a printing object, wherein a solid sublimation dye is carried in the agent treatment layer by spraying liquid sublimation dye on the agent treatment layer to allow a transfer image to be infiltrated into the agent treatment layer and hardening the liquid sublimation dye infiltrated into the agent treatment layer. The transfer image is printed on the printing object by sublimating the dye carried on the agent treatment layer and infiltrating the sublimated dye into enlarged pores of a texture of the printing object by heating the printing object.

Direct inkjet printing on fabrics is a well-established technique, however, fabrics and other textile substrates present challenges to the inkjet printing technology in that the substrates are typically absorptive, flexible and stretchable, oftentimes colored (non-white), and are used in a variety of dynamic and wearing environments, including activewear and sportswear, repetitive washing, drying and folding, and the like. As inkjet printing technology is a non-contact printing where small size ink drops is being applied directly on different substrates, including textiles, it presents a challenge for achieving high quality sharp images, due to ink drops mobility on the substrate, which must be limited. Ink drop mobility, particularly soaking, spreading and bleeding should be limited on various fabric substrates, since color to color bleeding adversely affects the resulting prints quality. There are number of theories that attempt to explain the mechanisms of color bleeding and offer solutions that are mainly based on chemical or physical reactions/processes between the ink and the pretreated substrate. Most of these solutions require substrate pre-treatment, offline the printing process and machinery; however, most of these pre-treatments lower the quality of the fabric, degrade some of its most values properties, and/or jacks-up costs.

In the context of dye-sublimation printing techniques, direct inkjet is even more problematic, since the dye-sublimation ink composition, which does not contain pigment particles, film-forming agents and/or substrate binders, is more likely to feather sideways and bleed into the fabric, leading to greater loss of sharpness of the printed image, while the step of heating the substrate having the dye printed thereon leads to further spreading of the ink droplet while the dye molecules sublime and diffuse in the gaseous state to all directions from the feathered droplet. Thus, direct inkjet techniques have not been successfully implemented using dye-sublimation inks.

PCT Application Nos. WO 2005/115089 and WO 2005/115761, by the present assignee, and which are both incorporated by reference as if fully set forth herein, teach a process, a composition and an apparatus for printing an image on an absorptive surface, such as an untreated (a substrate that has not been pre-treated chemically) textile piece, that includes applying a wetting composition on the surface which is capable of interfering with the engagement of a liquid ink composition with the binding sites of the surface. According to the processes taught in these patent applications, once the wetting composition is applied, the liquid ink composition is applied while the surface is still wet. Using this process, a vivid color image is formed on the absorptive surface. These patent applications, however, fail to address the limitations associated with printing a color image on an absorptive dark surface.

Multi-part ink compositions, which are based on contacting an immobilizing composition and a colored ink composition on the surface of an untreated substrate, so as to congeal the colored ink composition on the substrate, thereby minimizing feathering and soaking thereof into absorptive substrates, are also taught in U.S. patent application Ser. No. 11/588,277 (U.S. Patent Application Publication No. 20070104899), U.S. patent application Ser. No. 11/606,242 (U.S. Patent Application Publication No. 20070103529), and U.S. patent application Ser. No. 14/619,218 (U.S. Patent Application Publication No. 20150152274), all of which are incorporated by reference as if fully set forth herein.

U.S. Pat. No. 7,134,749, by the present assignee, which is incorporated by reference as if fully set forth herein, teaches a method and an apparatus for color printing on an untreated dark textile piece which includes digitally printing, by means of an inkjet printer head, an opaque white ink layer directly onto the untreated dark textile piece, and digitally printing a colored image on the white ink layer. One of the main principles in this method is the digital printing of the white ink layer, which is performed such that the white ink layer substantially covers, without exceeding, the designed area of the next to be printed colored image, and further such that the white ink layer and the colored image are substantially coextensive. All the printing steps in this method are performed by essentially using conventional inkjet printing techniques.

U.S. Pat. No. 8,540,358, by the present assignee, which is incorporated by reference as if fully set forth herein, teaches an inkjet ink compositions for forming an image in a form of an elastic film attached to a surface of an untreated stretchable and/or flexible substrate and processes utilizing same for inkjet printing color images on various substrates such as colored and absorptive or impregnable stretchable materials, which are characterized by heightened efficiency in process time, ink and energy consumption, as well as products having durable, wash-fast and abrasion-fast images printed thereon by the process, are disclosed.

Direct inkjet printing of pigments on untreated fabrics has enjoyed the improvements provided by the aforementioned technologies, since the emulsified and suspended pigment particles are required to be bound to the substrate by means of film-forming agents, adhesion agents and/or binders, forming a film that encapsulates the pigment particles while adhering to the substrate. The aforementioned technologies employed the presence of emulsified film-forming adhesion agents and film-forming binders and/or dispersants of the suspended pigment particles, by utilizing property-sensitive variants of these ingredients, wherein these ingredients tend to lose their solubility in the ink's medium, and thereby cause coagulation of the ink composition when contacting with a property-adjusting agent (e.g., an acid) on the surface of the substrate.

Since film-forming agents, adhesion agents and/or binders are not present in a typical dye-sublimation ink composition, and the presence of which may negate some of the principles of dye-sublimation methodologies, the aforementioned improvements of direct inkjet printing on untreated substrates were not implemented in dye-sublimation processes.

SUMMARY OF THE INVENTION

Embodiments of the present invention relate to a dye-sublimation printing process, based on direct inkjet methodologies, devoid of the use a transfer medium or chemical pretreatment of the substrate, which improves or at least preserves the quality of the printed image afforded by presently known dye-sublimation methodologies, while simplifying and lowering the cost of the printing process. The dye-sublimation ink composition is formulated to include a property-sensitive agent, which is sensitive in the sense that it causes the ink composition comprising the dye to coagulate on contact with a property-adjusting agent on the surface of an untreated substrate, thereby forming a small and confined dot of ink on the substrate that subsequently undergoes heating to sublime the dye that penetrates the fibers of the substrate. The presently provided technique is effective regardless of the presence of film-forming ingredients in the ink composition, and eliminates the limitations associated with direct inkjet printing of dye-sublimation ink compositions on untreated substrates (fabrics and other surfaces) suitable for dye-sublimation printing.

According to an aspect of some embodiments of the invention, there is provided a process of direct inkjet printing an image on an absorptive substrate using a dye-sublimation ink composition, includes contacting at least a portion of the substrate with an immobilizing composition, printing the dye-sublimation ink composition directly on the portion of the substrate, and heating the substrate to thereby form the image on the surface of the substrate.

In some embodiments, the ink composition is formulated to coagulate on the portion of the substrate upon contacting the immobilizing composition, thereby substantially preventing the dye-sublimation ink composition from soaking into the absorptive substrate.

In some embodiments, the ink composition includes a sublimable dye, a property-sensitive agent and a carrier, and the immobilizing composition includes a property-adjusting agent and a carrier.

In some embodiments, the property-sensitive agent is an alkali-soluble agent.

In some embodiments, the alkali-soluble agent is selected from the group consisting of an alkali-soluble dispersant, an alkali-soluble surfactant, an alkali-soluble polymer, an alkali-soluble coagulant and an alkali-soluble gelling agent.

In some embodiments, the alkali-soluble agent is an alkali-soluble polymer.

In some embodiments, the property-adjusting agent is selected from the group consisting of an acid, a metal oxide and a divalent metal cation.

In some embodiments, the dye-sublimation ink composition is essentially devoid of a film-forming agent.

In some embodiments, the immobilizing composition and the ink composition are each individually applied on the portion of the substrate by a separate applicator selected from the group consisting of a nozzle and a printhead.

In some embodiments, the immobilizing composition and/or the ink composition formulated for application from a printhead is characterized by at least one of:
a maximal particle size of less than 1 microns;
a dynamic viscosity at shear that ranges from 2 to 25 centipoise;
a printing temperature Brookfield viscosity less than 25 centipoises;
a surface tension that ranges from 24 to 32 mN/m; and
an electrical resistance of 50 to 2000 ohm per centimeter.

In some embodiments, the immobilizing composition being for application from a nozzle is characterized by at least one of:
a maximal particle size of less than 100 micron;
a dynamic viscosity at shear that ranges from 2 to 400 centipoise;
a printing temperature Brookfield viscosity less than 400 centipoises;
a surface tension that ranges from 15 to 70 mN/m; and
an electrical resistance of 50 to 2000 ohm per centimeter.

In some embodiments, the ink composition is applied by the inkjet printhead.

In some embodiments, the immobilizing composition is applied by the inkjet printhead and/or the nozzle.

In some embodiments of the process presented herein, printing is effected concomitantly within a time period that ranges from 0.01 seconds to 15 minutes.

In some embodiments, the immobilizing composition is applied in-line with the ink composition.

In some embodiments, the ink composition is applied on the substrate while the substrate is still wet with the immobilizing composition.

In some embodiments of the process presented herein, heating is effected to a temperature that ranges from 140 to 220° C.

In some embodiments, heating is effected under press at a pressure that ranges from 0.5 to 5 kg per cm$^2$.

In some embodiments, heating is effected under press for a time period that ranges from 10 to 90 seconds.

In some embodiments of the process presented herein, the substrate on which the image is printed is an untreated substrate.

In some embodiments of the process presented herein, the substrate is devoid of the property-adjusting agent prior to the contacting.

According to an aspect of some embodiments of the invention, there is provided a dye-sublimation ink composition, which includes a sublimable dye and a property-sensitive agent.

In some embodiments, the composition presented herein further includes a carrier.

In some embodiments, the carrier of the composition is an aqueous carrier.

In some embodiments, the property-sensitive agent is rendered insoluble in the carrier upon contacting a property-adjusting agent selected from the group consisting of an acid, a metal oxide and a divalent metal cation.

In some embodiments, the property-sensitive agent is selected from the group consisting of an alkali-soluble agent, an acid-sensitive agent, a metal oxide-sensitive agent, a divalent metal cation-sensitive agent, and a combination thereof.

In some embodiments, the property-sensitive agent is a dispersing agent, associated with dispersing or emulsifying the sublimable dye in the carrier.

In some embodiments, the property-sensitive agent effects coagulation of the ink composition upon contacting the property-adjusting agent.

In some embodiments, the concentration of the property-sensitive agent in the ink composition is greater than 1% by weight of the total weight of the composition.

In some embodiments, the concentration of the property-sensitive agent in the ink composition ranges from 1% to 30% by weight of the total weight of the composition.

In some embodiments, the property-sensitive agent is an alkali-soluble agent.

In some embodiments, the alkali-soluble agent is selected from the group consisting of an alkali-soluble dispersant, an alkali-soluble surfactant, an alkali-soluble polymer, an alkali-soluble coagulant and an alkali-soluble gelling agent.

In some embodiments, the alkali-soluble agent is an alkali-soluble polymer.

In some embodiments, the alkali-soluble polymer is an aqueous alkali-soluble acrylic polymer.

In some embodiments of the composition presented herein, the pH of the composition is higher than 7.5.

In some embodiments, the composition further includes an alkali pH-adjusting agent.

In some embodiments of the composition presented herein, the composition is substantially devoid of a film-forming agent.

In some embodiments of the composition presented herein, the composition is suitable for direct inkjet printing from an inkjet printhead.

In some embodiments of the composition presented herein, the composition is characterized by at least one of:
- a maximal particle size of less than 1 microns;
- a dynamic viscosity at shear that ranges from 2 to 25 centipoise;
- a printing temperature Brookfield viscosity less than 25 centipoises;
- a surface tension that ranges from 24 to 32 mN/m; and
- an electrical resistance of 50 to 2000 ohm per centimeter.

According to an aspect of some embodiments of the invention, there is provided an inkjet printing kit (an ink set) that includes at least the dye-sublimation ink composition presented herein and an immobilizing composition.

In some embodiments, the kit is identified in print, in or on the packaging material, for use in printing an image on an absorptive substrate using the dye-sublimation ink composition, while immobilizing the ink composition upon contact with the immobilizing composition.

In some embodiments, each of the immobilizing composition and the ink composition in the kit are packaged separately in a packaging material.

According to an aspect of some embodiments of the invention, there is provided a digital printing machine (an inkjet printer) for forming an image on an absorptive substrate by direct inkjet printing a dye-sublimation ink composition, such as the ink composition presented herein, on the substrate; the printer includes:
  i. at least one applicator for applying an immobilizing composition on at least a portion of the surface of the substrate;
  ii. at least one printhead for printing the dye-sublimation ink composition on the surface; and
  iii. a heat-press for exerting heat and pressure to the surface of the substrate after applying the immobilizing composition and after printing the ink composition, wherein the heat under pressure is applied to the freshly printed substrate for subliming the sublimable dye in the dye-sublimation ink composition, thereby forming the image on the substrate.

In some embodiments, the printhead is located in-line or after (downstream) the applicator.

In some embodiments, the machine further includes a controller for positioning and timing of the applicator and the printhead.

In some embodiments, the heat-press is located after (downstream) the applicator and the printhead.

In some embodiments, the machine further includes a printing table assembly for moving the substrate to the heat-press while the substrate is wet from the immobilizing composition and the ink composition.

In some embodiments, the machine further includes a controller for coordinating relative motion between the applicator, the printhead, the heat-press and the printing table-assembly.

In some embodiments, the machine presented herein, the applicator of the immobilizing composition is in the form of a nozzle (spray nozzle) or a printhead.

In some embodiments, the nozzle or sprayer for applying the immobilizing composition is configured for applying the immobilizing composition at a rate of 1-40 mg/cm$^2$.

In some embodiments, the printhead is configured for the applying the immobilizing composition or the ink composition at a rate of 4,000-50,000 drops per second, a drop size that ranges from 1.5 to 80 picoliter and/or a resolution of 300 to 2880 dpi.

In some embodiments of the machine presented herein, the heat-press is in a form selected from the group consisting of a stationary flat heat-press, a movable flat heat-press, a stationary roller (calender) heat-press, a movable roller heat-press and a vacuum heat-press.

In some embodiments, the machine further includes a controller for regulation of temperature, pressure and timing of the heat-press.

In some embodiments, the machine further includes a temperature regulation mechanism for regulating a temperature exerted by the heat-press.

In some embodiments, the heat-press is configured for exerting heat to the substrate at a temperature that ranges from 140 to 220° C.

In some embodiments, the pressure regulation mechanism is one member of a group consisting of heating element and a heat sensor.

In some embodiments, the machine further includes a pressure regulation mechanism for regulating a pressure exerted by the heat-press.

In some embodiments, the heat-press is configured for exerting pressure to the substrate that ranges from 0.5 to 5 kg per cm$^2$.

In some embodiments, the pressure regulation mechanism is one member of a group consisting of a counter balance, adjustable mechanical spring and a pneumatic adjustable pressure unit.

In some embodiments, the machine further includes at least one timing mechanism for coordinating the various elements therein.

In some embodiments, the heat and the pressure are effected for a time period that ranges from 10 to 90 seconds.

In some embodiments of the machine presented herein, the absorptive substrate is a fabric or a textile garment that includes synthetic fibers.

In some embodiments, the fabric or the textile garment is untreated, and is devoid of a property-adjusting agent or an agent for preventing the soaking of the ink composition therein prior to using the machine presented herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will prevail. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
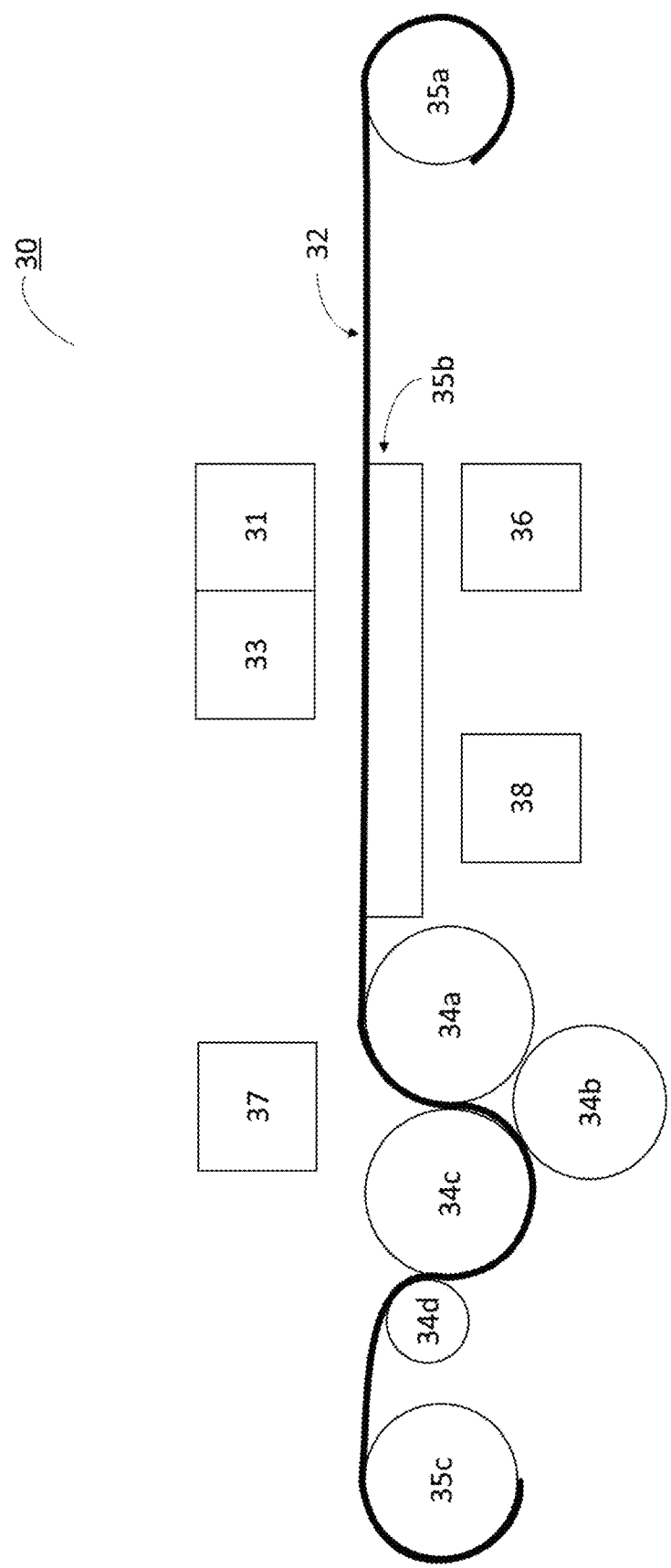
FIG. 1 presents a schematic illustration of an exemplary roll-to-roll dye-sublimation direct-on substrate inkjet printing machine, according to some embodiments of the present invention, wherein exemplary printing machine 30 comprises applicator 31 for applying an immobilizing composition on the surface of substrate 32, printhead 33 for printing the dye-sublimation ink composition on the surface of substrate 32, heat-press 34a-d in the exemplary form of a rollers-system (calender) heat-press for exerting heat and pressure to substrate 32 after applying the immobilizing composition and printing the ink composition thereon, and printing table assembly 35b for moving and holding substrate 32 from the upstream roll 35a to downstream roller 35c relative to applicator 31, printhead 33 and heat-press 34, and further comprises controller 36 for positioning and timing applicator 31 and printhead 33, controller 37 for regulation of temperature, pressure and timing heat-press 34, and controller 38 for coordinating relative motion between applicator 31, printhead 33, heat-press 34 and printing table assembly 35.

The present invention, in some embodiments thereof, relates to textile printing and, more particularly, but not exclusively, to printing of dye-sublimation ink compositions directly onto absorptive substrates.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As mentioned hereinabove, currently known inkjet printing technologies are not suitable for direct printing of dye-sublimation ink compositions, particularly on absorptive substrates such as polyester fabrics, due to soaking and spreading of the jetted ink droplet on and into the substrate, and the subsequent feathering of the ink during the heat-driven sublimation step of the printing process.

As further presented above, while the problem of bleeding of pigment-based inks has been mitigated by using a multi-part ink system wherein a property-sensitive colored ink composition (e.g., a pH-sensitive ink composition) is immobilized as a result of a film-forming adhesion agent, binder or pigment dispersant in the ink coming in contact with an immobilizing composition containing an acid, this approach has not been implemented for dye-sublimation ink composition since these ingredients are not present, and should not be in such inks.

While contemplating the use of dye-sublimation ink composition in direct inkjet printing on synthetic fabrics, such as polyesters, acrylic or polyamide fabrics and other substrates suitable for dye-sublimation, the present inventors have contemplated adding a property-sensitive agent into the dye-sublimation ink composition, and the use of an immobilizing composition that can be applied digitally by inkjet printhead or by spray nozzle, which will react with the dye-sublimation ink droplets and cause their immobilization (coagulation, congelation, jellification, sedimentation, solidification or otherwise a sharp increase in viscosity), thereby substantially preventing or arresting soaking, bleeding, feathering and/or vertical penetration of the dye-sublimation ink into the fabric. The present inventors have envisioned that if such coagulation can be effected instantly upon contact of the dye-sublimation ink composition with the substrate, the immobilization of the ink droplet will assist in preventing excessive soaking of the ink in its liquid or dissolved state, and further limit feathering of the sublimed dye molecules in the gas phase during the heating step. Moreover, it has been envisioned that control over the concentration of the property-sensitive agent in the dye-sublimation ink composition, and control over the immobilizing composition concentration and quantity, one would be able to control the degree of penetration of the ink into the fabric where such penetration is disadvantageous.

Briefly, the immobilization of the ink composition is generally effected on at least a portion of a surface of a substrate with the aim of limiting or arresting soaking, spreading and feathering of the ink composition in/on the surface of the substrate, collectively referred to herein a as "soaking", particularly when inkjet-printing the ink composition on an absorptive substrate, such as textile. According to some embodiments of the present invention, the substrate is a textile substrate, such as a woven or non-woven fabric, a cloth, a garment and/or a piece of clothing.

Quantitatively, "immobilization" in the context of embodiment of the present invention is defined as elevating the viscosity of the color-bearing ink composition by 10-folds, 50-folds, 100-folds, 500-folds 1000-folds or 2000-folds and more. For example, when a given color-bearing ink composition is characterized by having a viscosity of 2-25 centipoises, it is defined as immobilized when its viscosity is elevated to about 2000 centipoises or higher as a result of congelation. In some embodiments, the term "immobilization" is used to refer to a sharp increase in viscosity of a liquid, such that droplets of the liquid are less prone to flow, soaking, bleeding, spreading and feathering.

Hence the chemical and/or physical change, which affects the droplets of liquid ink composition, according to some embodiments of the present invention, is generally referred to herein as "immobilization". In the context of the chemical and mechanical change that occurs in the ink composition, according to some embodiments of the present invention, the term "immobilization", as used herein, is interchangeable the terms "coagulation", "congelation", "flocculation", "precipitation", "thickening" or "gelation", and vice-versa, and refer to the sharp decrease in fluidity of a formerly fluid liquid. Coagulation can be effected also by, or seen as sedimentation, precipitation, partial solidification and partial polymerization of soluble constituents in the composition. The term "sedimentation", as used herein, refers to the destabilization of suspended colloidal or emulsified substances, such as pigment particles. The term "flocculation", as used herein, refers to the bridging between particles by a polymer chain, causing them to form flocs or larger aggregates that might sediment or precipitate.

Dye-Sublimation Ink Composition Designed for Controlled Immobilization:

According to an aspect of embodiments of the present invention, there is provided a dye-sublimation ink composition that includes a sublimable dye and a property-sensitive agent, as defined hereinbelow. According to some embodiments, the dye-sublimation ink composition further includes a carrier, such as an aqueous carrier.

Sublimable dyes are typically insoluble in water, and are therefore introduced into an aqueous carrier-based ink compositions as dispersions or emulsions, depending on the physical state they take at room temperature (solid or liquid). Most sublimable dyes are solid particles made of aggregates of water-insoluble small organic molecules, which are rendered dispersible in the aqueous carries by means of a dispersing agent, or dispersant, which may also be referred to as a surfactant. These surface active agents encapsulate the dye particle and allow it to be dispersed in aqueous carries. Some sublimable dye particles are modified to present hydrophilic "tails", namely the dye molecule is modified into a water-bore molecule by virtue of a hydrophilic moiety attached thereto. In the context of embodiments of the present invention, the sublimable dyes are present in any dispersed or emulsified form, being by surfactants, dispersing agents or by chemical modification.

Exemplary sublimable dyes include, without limitation, C.I. Disperse Red 60, C.I. Disperse blue 359, C.I. Disperse blue 360, C.I. Disperse blue 56, C.I. Disperse Yellow 54, C.I. Disperse Orange 25 and C.I. Disperse Brown 27, some of which are known by their trade names, such as Orcocilacron™ Disperse Dyes for Polyester, SunChemical Jetsperse DS, Diamond Dispersions DS, Jetcolour JSUB, Hollindia International BV Holcron, Standard Colors PERMASIL and Jay Chemical Industries Jaylene. Additional liquid sublimable dyes available from Lever Colors Inc. under the trade name Cylcotrans™ include Disperse Blue 60, Disperse Blue 359, Disperse Blue 360, Disperse Yellow 54, Disperse Red 60, Disperse Orange 25 and Disperse Black Mix.

Also useful are low energy sublimable dyes, such as Holcron Fast Yellow 3GL (a disperse Yellow 54 sublimable dye), Holcron Yellow 3G (a disperse Yellow 64 sublimable dye), Holcron Orange 2RL (a disperse Orange 25 sublimable dye), Holcron Scarlet 2G (a disperse Red 50 sublimable dye), Holcron Red FB (a disperse Red 60 sublimable dye), and Holcron Blue FBL (a disperse Blue 56 sublimable dye), commercially available from Hollindia International BV.

According to some embodiments of the present invention, the ink composition is formulated so as not to impart a film on the surface of the substrate, hence, the ink composition is essentially devoid of a film-forming agent. In the context of embodiments of the present invention, film-forming agents include adhesion-promoting agents, binders, and some high-molecular weight resins.

Inkjet ink compositions may further include additional ingredients such as humectants/wetting agents, surface active agents, defoamers, anticorrosion agents, antimicrobial agents, thickening/viscosity modifying agents and the likes.

It is noted that any exemplary ingredient disclosed herein is given for exemplifying purposes only, and should not be regarded as limiting to that particular ingredient or commercially available product, but rather regarded as a representative member of a wider group of alternatives, all of which are meant to be encompassed in the context of other embodiments of the present invention.

Exemplary viscosity modifying agents include, without limitation, associative thickeners, Newtonian rheology additives, glycols, polyethyleneglycol, propylene glycol, triethylene glycol, diethylene glycol, glycerin, high molecular weight alcohols, carbowaxes, polyvinyl alcohols, polyvinyl pyrrolidones, and any combination thereof. Some viscosity modifying agents may double-act as humectants/wetting agents.

Exemplary humectants/wetting agents suitable for the present dye-sublimation inkjet ink composition include, without limitation, glycerin, glycol ethers, propylene glycol, dipropylene glycol, tripropylene glycol and the like; and thickeners such as TEGO® ViscoPlus, BASF Rheovis®, DOW ACRYSOL™, BYK 425 and BYK 428.

Exemplary surface active agents include, without limitation, polyether modified poly dimethyl siloxanes, polymethylalkylsiloxane, polyester hydroxyl modified poly-dimethylsiloxane, a fluorocarbon/hydrocarbon anionic surfactant, a polyacrylic copolymer and any combination thereof.

Exemplary anticorrosion agents include, without limitation, tolyltriazole (methylbenzotriazole, benzotriazole, and combinations thereof.

In order for being suitable for inkjet printing, according to some embodiments of the present invention, the dye-sublimation ink composition presented herein is characterized by at least one of:
a maximal particle size of less than 1 microns;
a dynamic viscosity at shear that ranges from 2 to 25 centipoise;
a printing temperature Brookfield viscosity less than 25 centipoises;
a surface tension that ranges from 24 to 32 mN/m; and
an electrical resistance of 50 to 2000 ohm per centimeter.

Property-Sensitive Agent:

In some embodiments, the dye-sublimation ink composition presented herein includes a dispersed or emulsified sublimable dye and a property-sensitive agent, wherein the property-sensitive agent is selected capable of causing congelation of the ink composition upon contacting a property-adjusting agent, as these agents are discussed hereinbelow. Without being bound by any particular theory, it is noted that the property-sensitive agent losses its solubility in the carrier of the ink composition (the property-sensitive agent is rendered insoluble in the carrier) upon contacting the property-adjusting agent, at least to some extent that is sufficient to cause congelation/coagulation of the ink composition.

In some embodiments, the loss of dispersibility of the sublimable dye causes coagulation of the sublimable dye particles in the ink composition such that the particles clump in the carrier and can no longer be soaked into the substrate with the carrier. In the context of embodiments of the present invention, the congelation of the entire droplet of ink into a gel, or the clumping and coagulation of an insoluble mass comprising the dye particles in a liquid carrier, are jointly referred to herein as coagulation of the ink composition.

In some embodiments the sublimable dye dispersing agent, or the chemically attached hydrophilic moiety on the sublimable dye, is selected to be property-sensitive, wherein the property-sensitive characteristic causes coagulation of the ink composition upon contacting a property-adjusting agent.

Ink coagulation can be afforded, according to some embodiments, by adding to the dye-sublimation ink composition one or more alkali-soluble property-sensitive agents (e.g., acid-sensitive or metal oxide-sensitive coagulants/agents), polypeptide-based property-sensitive agents (e.g., acid-sensitive coagulants/agents) and polysaccharide-based property-sensitive agents (e.g., divalent metal cation-sensitive coagulants/agents), or a combination thereof. According to some embodiments of the present invention, the property-sensitive agent is an alkali-soluble agent or an acid-sensitive agent.

In some embodiments, the property-sensitive agent is an alkali-soluble agent, which can be associated with dispersing the sublimable dye particles, an alkali-soluble agent that is not associated with dispersing the sublimable dye particles, or a combination thereof. For example, a property-sensitive surfactant, dispersing agent or hydrophilic moiety can be alkali-soluble, wherein such an alkali-soluble surfactant, dispersing agent or the chemical attached hydrophilic moiety is sensitive to a decrease in pH, such as effected in the presence of an acid, whereupon contact an acid, the sublimable dye particle is no longer dispersed in the carrier, causing the ink composition comprising the same to coagulate (undergo sharp increase in viscosity).

In embodiments wherein the surfactant, dispersing agent or the chemical attached hydrophilic moiety are property-sensitive, they are regarded as a part of the property-sensitive agent required in the ink composition, according to embodiments of the present invention. In some embodiments, the amount of the property-sensitive agent required in the dye-sublimation composition presented herein is determined and set regardless of the dye dispersing agent or the chemical attached hydrophilic moiety on the dye molecules.

According to some embodiments of the present invention, the total amount of the property-sensitive agent, be it associated with dispersing the dye or not, is set such that it is sufficient to effect coagulation of the ink droplet on the substrate. According to some embodiments, the mass ration of property-sensitive agent to sublimable dye is at least 1:1, or at least 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, or 3:1 by mass in the dye-sublimation ink composition. Typically, the mass percentage of the sublimable dye in the dye sublimation ink composition presented herein ranges from 1-10% of the total mass of the composition, or 1-2%, 1-3%, 1-4%, 1-5%, 1-6%, 1-7%, 1-8% or 1-9% by mass sublimable dye in the dye sublimation ink composition.

Hence, a concentration of said property-sensitive agent in the ink composition is greater than about 1% of the total mass of the ink composition, or at least 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%.

In the context of the present invention, a property-sensitive agent, of which the property is pH, and is sensitive to acid such that it causes coagulation of the ink composition upon contacting an acid, is also referred to as an alkali-soluble agent. According to embodiments of the present invention, alkali-soluble agents include alkali-soluble dispersants, alkali-soluble surfactants, alkali-soluble polymers, alkali-soluble coagulants and alkali-soluble gelling agents.

According to some embodiments, the alkali-soluble agent is an alkali-soluble polymer, such as, for example, an alkali-soluble acrylic polymer or alkali-soluble co-acrylic polymer such as poly(styrene/acrylic acid) polymer. It is noted herein, without being bound by any particular theory, that alkali-soluble acrylic or co-acrylic polymers are rendered soluble in alkaline conditions under-which the carboxylic groups in the polymer are charged; whereupon acidification of the aqueous medium containing the alkali-soluble polymer, the charged groups become neutral, leading to loss of solubility in aqueous media. In some embodiments, the alkali-soluble property-sensitive agent is selected from the group consisting of an emulsified polyurethane, a polyurethane polymer, a polyether polymer, a polyester polymer, a polyacrylate polymer, a polyvinyl chloride polymer, a polyvinyl acetate polymer, a polyvinyl butyral polymer, an aminosilicon polymer and any salt, co-polymer or combination thereof. Commercially available alkali-soluble polymers include Joncryl 586, Joncryl 678, Joncryl 96, Joncryl 296 and Joncryl 538.

Alkali-soluble (acid-sensitive) surfactants for sublimable dyes, suitable for use in the context of some embodiments of the present invention, include cationic surfactants. Exemplary cationic surfactant include, without limitation, commercially available surfactants such as BYK's Disperbyk® family, BYK 3XX family, Air products Surfynol®&Dynol® family, BASF Plurafac® and Plurafac® family.

According to some embodiments of the present invention, the pH of the ink composition is maintained above neutral pH, namely the pH of the ink composition is higher than 7, higher than 7.5, higher than 8, higher than 8.5, higher than 9, higher than 9.5, higher than 10, higher than 10.5, or higher than 11. The pH of the ink composition can be set by the amount of all the alkali species therein, and can be further maintained at a desired level by use of an alkali pH-adjusting agent, such as a base of a buffer. Typically, the pH can be set to alkali levels by use of organic amines and/or ammonium hydroxide.

Immobilizing Composition and Property-Adjusting Agent:

According to some embodiments of the present invention, the immobilizing composition is formulated to carry and deliver a property-adjusting agent to the substrate, and does not contain a colorant and is thus substantially transparent and colorless, and intended not to leave a distinguishable mark on the substrate. Thus, according to some embodiments of the present invention, the immobilizing composition is essentially devoid of a colorant, pigment and/or dye.

The mechanical properties of the immobilizing composition presented herein are correlated, at least to some extent, to the properties of the liquid applicator used to apply the composition on the substrate. Suitable applicators include high-output capacity spray nozzles that are typically used to cover relatively large area of the substrate at relatively low resolution, and inkjet printheads, the latter being more delicate and complex and used for accurate drop placement (high resolution) at relatively low-output capacity. For simplicity, the term "nozzle" is used herein to refer to the high-output low resolution liquid applicator, and the term "printhead" is used to refer to the low-output high resolution liquid applicator. Output capacity may also be affected by the relative speed by which the applicator moves over the substrate (or the substrate moves under the applicator) during the printing process, however the output capacity is determined while taking that relative motion into account by reporting the total amount of liquid that is being delivered to a unit area at a unit time. A typical printhead delivers ink according to the varied digitized color requirements at any given image segment ("pixel"), pallet motion and printhead frequency, while a typical spray nozzle delivers constant amount under constant pressure of liquid over time, varied by pallet motion. For an exemplary comparison, a spray output capacity of a nozzle ranges about 4-5 grams per square inch at a pressure of about 1.5 bar, while the jetting output capacity of a printhead ranges about 0.002-0.05 grams per square inch. For example, for 600 DPI prints (360,000 pixels in square inch), using 4 pl drop for one pixel, the spray output capacity translate to about 1.44*µl per square inch or about 1.44 mg per square inch, and for using 80 pl drops, about 0.03 grams per square inch.

The immobilizing composition presented herein is formulated so as to be suitable for application thereof in-line of an inkjet printing process. In other words, the immobilizing composition is designed to be applied directly on the substrate as part of the printing process rather than a pretreatment step before the printing process, which can take place off-line of the inkjet printing process. Such formulation incurs some limitations of the immobilizing composition, particularly in the sense that the composition is required to be suitable for inkjet applicators that form a part of the inkjet machinery, and particularly the parts that involve direct inkjet printing.

According to some embodiments, when the immobilizing composition is designed to be applied (sprayed) by a nozzle, its ingredients are selected and/or treated such that the composition exhibits (characterized by) at least one of the following attributes:
 a maximal particle size of less than 200, 150, 100, 50, 25, 10 or 5 microns;
 a dynamic viscosity at shear that ranges from 2 to 400 centipoises;
 a room temperature Brookfield viscosity less than 400 centipoises;
 a surface tension that ranges from 15 to 70 mN/m; and
 an electrical resistance of 50 to 2000 ohm per centimeter.

According to some embodiments, when the immobilizing composition is designed to be applied (jetted) by a printhead, its ingredients are selected and/or treated such that the composition exhibits (characterized by) at least one of the following attributes:
 a maximal particle size of less than 1, 5 or 10 microns;
 a dynamic viscosity at shear that ranges from 2-25 centipoises;
 a printing temperature Brookfield viscosity less than 25 centipoises;
 a surface tension that ranges from 24 to 32 mN/m; and
 an electrical resistance of 50 to 2000 ohm per centimeter.

According to some embodiments of the present invention, the immobilizing composition is a water-based composition, and the immobilizing composition carrier is an aqueous carrier, or water.

One of the objectives of using an immobilizing composition containing a property-adjusting agent as one (first) part, and an ink composition containing property-sensitive agent in a separate (second) part, is to provide the means to immobilize (coagulate, congeal etc.) the ink composition only upon contacting the two parts on the surface of the substrate and not beforehand, thus avoiding clogging of the delicate elements of the printing machine. The property-adjusting agent is selected such that it effects a change in the property-sensitive agent, thereby effecting congelation of the ink composition.

The term "property" in the context of a "property-adjusting agent" or a "property-sensitive agent", as used herein, refers to a chemical and/or physical property of an ingredient in the ink composition that is sensitive to the presence or to an increase in the amount of the property-adjusting agent—a sensitivity that is expressed inter alia by losing the ability to stay liquid, dissolved, dispersed or emulsified. In other words, the presence or an increase in the amount of the property-adjusting agent causes a property-sensitive agent in the ink composition to break the suspended or the emulsified state of the ink composition (dispensability), leading to immobilization thereof. Representative examples of such properties include, without limitation, acidity (pH), metal atom complexation (metal ion concentration), ionic strength and hydrophobicity.

Hence, the phrase "property-adjusting agent" as used herein refers to a component in the immobilizing composition that can affect the immobilization of an ink composition comprising a property-sensitive agent, such that when the immobilizing composition and the ink composition come in contact and combine, the ink composition coagulates/congeals. For example, an acid, acting as a property-adjusting agent in the immobilizing composition, will change pH level of the ink composition, causing a pH-sensitive agent therein to precipitate, thereby causing the ink composition to coagulate/congeal. By effecting a change in one or more such properties, the property-adjusting agent is causing the property-sensitive agent to undergo a chemical and/or physical change (such as coagulation/congelation), as discussed herein. Hence, in some embodiments, a metal-ion-ligand complexation, a sharp change in the ionic strength, a sharp change in the hydrophobicity or a sharp change in the electric charge/valency of the ink composition, will cause it to coagulate/congeal. Exemplary property-adjusting agents include acids, metal oxides and divalent metal cations.

According to some embodiments, the metal oxide is present in the composition as a solute, a colloid or suspension. Exemplary metal oxides that can be used as a property-adjusting agents include alumina and titania.

According to some embodiments, the divalent metal cation is present in the composition as a solute, namely a cation of a dissolved salt. Exemplary divalent metal cations that can be used as a property-adjusting agents include $Ca^{2+}$, $Cu^{2+}$, $Cd^{2+}$, $Pb^{2+}$, $Fe^{2+}$ and $Mn^{2+}$, stemming from salts such as, for example, $CaCl_2$, $CdCl_2$, $Pb(NO_3)_2$, $FeCl_2$, $MnCl_2$ and $CuCl_2$.

An exemplary property is a pH-dependent dispensability and ionic-strength-dependent dispensability, also referred to herein as "alkaline dispensability", wherein the change in pH (the aforementioned acidity or alkalinity property) or the ionic-strength of a solution changes the dispensability of one or more of its dispersed species. Similarly, there exist inter-dependency between metal ion complexation combined with pH, and the capacity to stay dispersed/emulsified, and such interdependency is discussed in detailed hereinbelow. A property-adjusting agent that acts by adjusting the pH of the environment of a pH-sensitive agent, is therefore a pH-adjusting agent.

According to some embodiments of the present invention, the pH of the immobilizing composition is acidic due to the nature of the property-adjusting agent, being an acid. In such embodiments, the pH of the immobilizing composition is lower than 6.5, or ranges about 2-6, or about 2-5, or about 2-4. Optionally, the pH of the immobilizing composition ranges about 3-6, 4-6 or 5-6. The immobilizing composition may or may not contain a buffering agent. According to some embodiments, an immobilizing composition may be buffered by a suitable salt or weak base, such as ammonia/ammonium base or another volatile amine, to ensure the desired pH range while not leaving undesired traces on the substrate. Buffering may be accomplished by a buffering agent, such as, but not limited to a weak amine such as tris(hydroxymethyl aminomethane), also referred to as Tris or THAM.

Almost any small molecule acid, organic acid or polymeric acid will cause an ink composition containing a pH-sensitive agent to coagulate/congeal, and some acids might be more preferable for use in some embodiments and printing conditions and tasks. Less favorable acids include acids that impart a noticeable odor, or may burn-out the substrate, or leave a stain in the substrate, or cause a dye in the ink composition or the substrate to migrate or otherwise be diminished. According to embodiments of the present invention, pH-adjusting agents include glycolic acid (volatile), acetic acid (volatile with some vinegar odor), lactic acid (dimerized at elevated temperatures), malic acid, ascorbic acid, maleic acid, benzoic acid and several polymeric acids (acidic polymers).

Exemplary acidic polymers, which can be used beneficially as polymeric property-adjusting agent in the context of embodiments of the present invention, include, without limitation, polyacrylic acid, acidic alkoxylated polymer, poly(2-acrylamido-2-methylpropanesulphonic acid), poly(acrylic acid-co-maleic acid), poly(butadiene-co-maleic acid), poly(ethylene-co-acrylic acid), polymaleic acid, poly(methacrylic acid), poly(4-styrenesulfonic acid-co-maleic acid), and any mixture thereof.

In some embodiments of the present invention, the immobilizing composition may include one or more property-adjusting agents in a total amount that ranges from about 0.1% to about 30% of the total weight of the composition, or 0.5-15%, 0.5-10%, 0.1-5%, or 0.5-4%, or 0.5-3%, 1-6%, or 1-4%, or 1-3%, or 1-2% property-adjusting agent of the total weight of the immobilizing composition. If one or more property-adjusting agent is utilized, each property-adjusting agent may be present in any ratio between 0 and 100% comprising the blend as long as the total amount of the property-adjusting agent in the immobilizing composition is within the desired range.

In some embodiments of the present invention, the immobilizing composition is essentially devoid of a film-forming agent.

A Process of Direct Printing Dye-Sublimation Inkjet Images:

According to an aspect of embodiments of the present invention, there is provided a process of direct inkjet printing an image on an absorptive substrate using the dye-sublimation ink composition presented hereinabove, and an immobilizing composition as described hereinbelow.

The process presented herein is based on inkjet techniques, which are performed using standard or proprietary printheads and other standard or proprietary inkjet printing machinery elements. According to embodiments of the present invention, the process is designed to be implemented on an inkjet printing machine, described hereinbelow, which is designed specifically for optimal performance using the ink composition described herein.

The process, according to embodiments of the present invention, is based on the use of multi-components ink compositions, wherein all of the components (parts; compositions) are formulated and selected to be suitable also for the main inkjet printing techniques, such as the "drop-on-demand" technique and the likes, as these techniques are familiar to any artisan skilled in the art. Therefore, according to embodiments of the present invention, each of the immobilizing and/or ink compositions used in the processes presented herein is for use in an inkjet printing machine, wherein each compositions is applied (jetted, printed) from at least one different designated printhead and/or nozzle.

By "direct inkjet printing" it is meant that the image is printed directly on the surface of the substrate, as oppose to, for example, printing the image on a transfer medium which is later used to transfer the image to the designated final substrate. The process provided herein is not broken into two or more distinct steps, wherein a transfer medium serves as an intermediate substrate, before the image is transferred by sublimation from the transfer medium to the final substrate, but rather design to cut that intermediate step and transfer medium out of the process, by allowing a sublimable dye to be in an ink composition that is formulated such that the image is jetted directly on the final substrate.

According to some embodiments, the process presented herein, and the ink composition used in the process, are particularly useful for direct inkjet printing a dye-sublimation ink composition on absorptive substrates while overcoming the shortcomings and problems discussed hereinabove, and while rendering redundant the use of an intermediate transfer medium and/or substrate pretreatment.

In some embodiments, the substrate is a textile substrate suitable for dye-sublimation inks, such as polyester and other synthetic fabrics. Polyester and other synthetic and natural fibers and fiber blends exhibit the capacity to absorb liquids, including aqueous-based ink compositions. The process and ink composition provided herein are particularly useful for absorptive substrates which have not been pretreated prior to applying the ink and effecting the process thereon. In the context of the present invention, the term "pretreated" refers to a substrate, such as a fabric, that has been treated prior to the printing process to reduce its capacity to absorb liquids. A treated substrate, according to embodiments of the present invention, is a substrate that is treated off-line of the printing process, and is brought dry into the printing process for adding an image thereon. A treated substrate is treated on all parts and areas thereof regardless of the printing area, or at least treated on an area that is substantially larger than the printed area (treated area more than 10%, 20% or 30% larger than the printed area). According to embodiments of the present invention, an "untreated substrate" or "not pretreated substrate" refers to a substrate, such as a fabric or a garment, that has not been treated off-line of the printing process in order to reduce its capacity to absorb liquids. Also encompassed by the terms "untreated substrate" or "not pretreated substrate" are substrates that are essentially devoid of a property-adjusting agent therein or thereon, which has been introduced to the substrate before and off-line of the printing process. Further encompassed by the terms "untreated substrate" or "not pretreated substrate" are substrates that are essentially devoid of a substance that limits, substantially or to at least some extent, the penetration and soaking of liquids into the substrate, which has been added or applied on the substrate prior to the printing process, or off-line of the printing process. Exemplary substances that are typically applied on fabrics in order to limit their liquid-soaking capacity include, without limitation, hydrophobic resins, film-forming agents, silicone-based polymers and polysiloxanes, fluorinated ethylene/propylene copolymers and other fluorochemicals, polytetrafluoroethylene and polytrifluorochloroethylene. Substances, methods and tools for pretreating fibers and fabrics for reduced liquid-soaking are presented in, for example, U.S. Pat. Nos. 5,792,711, 6,225,403 and 8,524,041, which are incorporated herein by reference.

According to embodiments of the present invention, the process includes contacting at least a portion of the substrate with an immobilizing composition, concomitantly printing the dye-sublimation ink composition directly on said portion of the substrate, and heating the substrate to effect dye sublimation, thereby form the image on the surface of the substrate. According to some embodiments, the substrate is heated to about 200° C., or to a temperature that ranges from 140° C. to 220° C.

According to some embodiments of the present invention, heating of the substrate is effected while pressing the substrate (heating effected under press). Heat-press is applied at least on the printed area. Pressing is effected primarily to improve the transfer of the sublimed dye to the substrate by confining the space or distance made by the sublimed dye molecules. Pressing the printed area of the substrate while it is still wet from the ink and immobilizing compositions is advantageous and possible since there are essentially no film-forming agents on the substrate, and no film is formed on the substrate, therefore no damage can occur to the printed image or the substrate as a result of pressing the wet (or dried) image; in fact, pressing the wet ink on the substrate assists in evaporating the carrier in addition to confining the space within-which sublimation occurs. According to some embodiments, the substrate is pressed by a pressure/force of about 2.5 kg per $cm^2$, or by a pressure that ranges from about 0.5 to 5 about kg per $cm^2$.

According to some embodiments of the present invention, heat and pressure are exerted by the heat-press for a time period that ranges from 10 to 90 seconds.

The immobilizing composition is used to effect rapid coagulation of the ink composition by virtue of a property-adjusting agent present therein, which interacts or affects the property-sensitive agent in the ink. This rapid immobilization of the jetted droplets of the ink composition subsequently promotes improved color intensity and detail resolution of the image, by substantially reducing or arresting dye feathering and soaking by wicking.

According to some embodiments of the present invention, the process is carried out by digitally applying, by means of one or more inkjet printheads and/or nozzles, onto at least a portion of a surface of the substrate, the ink compositions presented herein, and the immobilizing composition, jointly referred to herein as a multi-part ink composition, which are formulated to be suitable for use in inkjet printheads and/or nozzles.

Since each of the immobilizing and/or ink composition used in the process presented herein is jetted by a digitally-control liquid applicator or printhead, the areas onto which each composition is applied can essentially overlap, covering substantially the same area of the image (coextensive areas). In particular, the immobilizing composition, which is essentially colorless and transparent, is applied onto the surface as a silhouette of the image, namely as a solid outline and featureless interior of the image. The silhouette may be somewhat larger that the image that will be printed thereon by 1-30%, 1-10% or by about 1%, 5%, 8%, 10%, 15%, 20%, 25%, 30%, 40%, 50%, 60%, 70%, 80%, 90%, or 100%. This digital control of applying the immobilizing composition further contributes to the reduction in the amount needed to effect immobilization of the ink composition, as the immobilizing composition does not form extending margins peripheral to the image, or form controllable extending margins. This effect also widens the scope of suitable substances which can be used to formulate the immobilizing composition, as staining of unprinted areas of the substrate, which are not covered by the image, is no longer a problem.

As presented hereinabove the immobilizing composition and the ink composition, are each individually applied/printed on the substrate by a separate printer element (nozzle and/or printhead) so as to keep the property-adjusting agent and the property-sensitive agent apart at all times before contacting them on the substrate.

According to some embodiments, the immobilizing composition is applied by a nozzle and the ink composition is applied by an inkjet printhead. According to some embodiments both the immobilizing composition and the ink composition are applied by separate inkjet printheads, referred to herein as the first printhead and the second printhead, respectively.

The printing process is designed and programmed such that the various compositions are applied concomitantly (or essentially simultaneously) on the surface of the substrate by a digitally controlled precise mechanism of timing and location, and that every drop in the ink compositions of all colors will come in contact with the immobilizing composition. The sequential order by which the immobilizing composition and ink composition are applied on the substrate can be any order, as long as the two types of liquid compositions come in contact therebetween before one of the compositions dries. Hence, according to some embodiments the immobilizing composition and the ink composition are applied concertedly, concomitantly or sequentially within a time period of less than 30 minutes, or within 0.01 seconds and 15 minutes. In some embodiments, the ink composition is applied on the substrate while the substrate is still wet with the immobilizing composition, or vice versa (in the reversed order).

The process presented herein, according to some embodiments thereof, is effected by applying all the various compositions, or parts of the multi-parts ink composition, by means of separate inkjet printheads/nozzles concurrently, substantially concomitantly, or very near concomitant application thereof. The term "concomitantly", as used herein, refers to the timing of one or more occurrences which take place concurrently, or almost concurrently, namely within a short time interval. According to embodiments of the present invention, this short time interval is less than one second, less than 3 seconds, less than 5 seconds, less than 10 seconds, less than 20 seconds, less than 30 seconds, less than 40 seconds, less than 50 seconds or less than 60 seconds between contacting the surface of the substrate with the immobilizing composition and contacting the surface of the substrate with the ink composition, or vice versa (in the reversed order). According to some embodiments, the time gap or interval between applying the immobilizing composition and the ink composition is shorter than about 1-10 seconds. The time interval is regarded as the time the lapses between the instant a droplet of a composition containing a property-adjusting agent or property-sensitive agent contacts the substrate, and the time a droplet of the counterpart component contacts the same region of the substrate. According to some embodiments of the present invention, this time interval can be shorter than 0.75 second, shorter than 0.50 seconds and even shorter than 0.25 seconds.

Since the ink composition and the immobilizing composition can both be applied on the substrate by means of printheads/nozzles which jet very small droplets of liquids at a controllable rate, one of the advantages of the process presented herein, is a considerable reduction in the total amount of applied liquids which are required to form a vivid and durable image of the substrate, a factor that translates directly into reduced printing times, leading to a great reduction in energy costs. While the ink composition is typically jetted from a printhead, the immobilization composition can be applied on the substrate from either a nozzle or a printhead, wherein the main difference between the two, according to embodiments of the present invention, is the accuracy of the drop-size, the drop location and overall resolution afforded by a printhead, which are typically lower in a nozzle.

Kits for Printing an Image:

Any of the compositions presented herein, can be provided to a user in the form of an inkjet printing kit. The term "kit", as used herein, refers to a single package containing any collection of items or components needed for a specific purpose, especially for use by a user or an operator.

According to an aspect of some embodiments of the present invention, there is provided an inkjet printing kit that includes a packaging material, at least one dye-sublimation ink composition (representing at least one color), according to some embodiments of the present invention, and an immobilizing composition.

According to some embodiments of the present invention, the kit is in a form wherein some of the ingredients of any one of the compositions presented herein, are packaged individually (separately) within the kit. According to some embodiments of the present invention, the kit may include one or more of the compositions in a ready-for-use form, packaged together within the kit.

According to some embodiments of the present invention, the kit contains at least two separate containers for each of the immobilizing composition and the ink composition, and can be used for loading two separate inkjet printheads or nozzles with their contents in preparation for an inkjet printing process, as described hereinabove.

In some embodiments, the packaging material is identified in print for use in printing an odorless image on a substrate that is effected by coagulating the ink composition upon contacting it with the immobilizing composition.

The kit may further include instructions for the user that includes the following directives:

Load the immobilizing composition to a first printhead or nozzle;

Load the dye-sublimation ink composition to a second printhead; and

Contact the immobilizing composition with the dye-sublimation ink composition by inkjet printing the compositions on a substrate.

A Digital Printing Machine:

According to some embodiments of the present invention, there is provided a digital printing machine for forming images on absorptive substrates by direct inkjet printing dye-sublimation ink compositions on the substrate. The printing machine is characterized, inter alia, by a direction of printing, which is based on the stepwise/sequential flow of the printing process. Namely, elements of the printing machine that carry-out or are involved with process steps that take place before other steps, are said to be located downstream or after elements that carry-out or are involved with process steps that take place thereafter. Physical spatial arrangement of elements of the printing machine may follow said location, or may not reflect the sequential flow of the process steps, namely the elements may be physically arranged in any order or arrangement regardless of their upstream or downstream location. The printing machine presented herein may be in a form of a linear machine, a carousel, a matrix, or any other printing machine.

The substrates may comprise garments or other textile items and fabric that may be based on any conventional or unconventional fiber material. The substrates may comprise felt, leather, fibrous materials, porous materials, materials having high surface tension with the ink composition, weaves of natural and synthetic fibers, weaves of mixtures of natural and synthetic fibers, natural fibers including wool, cotton, linen and synthetic fibers including nylon or suede.

Hence, the printing machine comprises at least one a digitally controlled applicator in the form of a spray nozzle, a printhead, a sprinkler or any other means of applying a liquid to a surface, configured for applying an immobilizing composition, as described hereinabove, on at least a portion of the surface of the substrate. Applying the immobilizing composition is performed for ink drop immobilization, thus limiting the penetration of the ink into the depth of the substrate, which may cause dull coloring of the garment (low color intensity), mixing of colors and blurring (feathering).

The machine further comprises at least one printhead for printing the dye-sublimation ink composition, as described hereinabove, on the surface of the substrate.

The machine further comprises a heat-press unit for exerting heat and pressure to the surface after applying the immobilizing composition and printing the ink composition. The heat and pressure are applied to at least the area of the substrate bearing the image so as to effect sublimation of the sublimable dye in the dye-sublimation ink composition, thereby forming the image on the substrate.

When using a conventional inkjet printing machine for printing dye-sublimation ink compositions on absorptive substrates, without the use of the present embodiments, the ink composition is absorbed into the substrate by wicking. Furthermore, when a conventional inkjet printing machine is used, the heating cannot be effected under a heat-press since the image comprises a film-forming agent that will stick to the press, as discussed above.

The machine may further comprise a printing table assembly for holding the substrate and moving various elements of the machine to various locations therein relative to one another and relative to the substrate. For example, the printing table assembly may be used to move the applicator and printhead over the substrate, and further bring the substrate to the heat-press after the immobilizing composition and the dye-sublimation ink composition have been applied and contacted thereon. Alternatively, the printing table assembly may be used to move the substrate from the immobilizing composition applicator(s) to the dye-sublimation composition printhead(s), and further to be used to place the substrate in or under the heat-press.

A printhead is the element of the machine that prints the dye-sublimation ink composition on the substrate to be printed. A printhead comprises at least one inkjet orifice. The printhead can be any conventional printhead, such as those marketed by Spectra, Inc., N.H., USA, and others known in the industry. A typical printhead suitable for use in the context of the present invention, comprises an array of inkjet orifices for performing digital printing. The inkjet printhead may comprise drop-on-demand piezoelectric inkjet orifices or continuous piezoelectric inkjet orifices. Multiple printheads may be used to inkjet print several different sublimable dyes or various colors on the substrate.

The applicator for applying the immobilizing composition may be a spray nozzle, a printhead, a sprinkler or an array of spray nozzles or printheads or sprinklers. The applicator may further include a tank serving as a reservoir for the immobilizing composition.

According to some embodiments, the applicator is in the form of a spray nozzle, which is configured for applying the immobilizing composition at a rate of 1-40 mg/cm$^2$.

In general, when using a printhead to apply the immobilizing composition, one can use a printhead suitable for printing any inkjet ink composition, including the dye-sublimation ink composition presented herein. According to some embodiments, the applicator is in the form of a printhead, which is configured for applying the immobilizing composition at a rate of 4,000-50,000 drops per second, a drop size that ranges from 1.5 to 80 picoliter and/or a resolution of 300 to 2880 dpi.

The printhead(s) for printing the ink composition may be located in-line (substantially at the same location) or downstream (after) the applicator(s) for applying the immobilizing composition. The heat-press may be located after the printhead(s) and the applicator(s). The heat-press exerts heat and mechanical pressure on the at least the area of the substrate bearing the freshly printed image. In some embodiments, the heat and pressure are applied to the image while the ink is still wet.

The heat-press may employ static pressure or motional pressure, and take the form selected from the group consisting of a stationary flat heat-press, a movable flat heat-press, a stationary roller (calender) heat-press, a movable roller heat-press and a vacuum heat-press.

FIG. 1 presents a schematic illustration of an exemplary roll-to-roll dye-sublimation direct-on substrate inkjet printing machine, according to some embodiments of the present invention, wherein exemplary printing machine 30 comprises applicator 31 for applying an immobilizing composition on the surface of substrate 32, printhead 33 for printing the dye-sublimation ink composition on the surface of substrate 32, heat-press 34a-d in the exemplary form of a rollers-system (calender) heat-press for exerting heat and pressure to substrate 32 after applying the immobilizing composition and printing the ink composition thereon, and printing table assembly 35b for moving and holding substrate 32 from the upstream roll 35a to downstream roller 35c relative to applicator 31, printhead 33 and heat-press 34, and further comprises controller 36 for positioning and timing applicator 31 and printhead 33, controller 37 for regulation of temperature, pressure and timing heat-press 34, and controller 38 for coordinating relative motion between applicator 31, printhead 33, heat-press 34 and printing table assembly 35.

Figure 2:
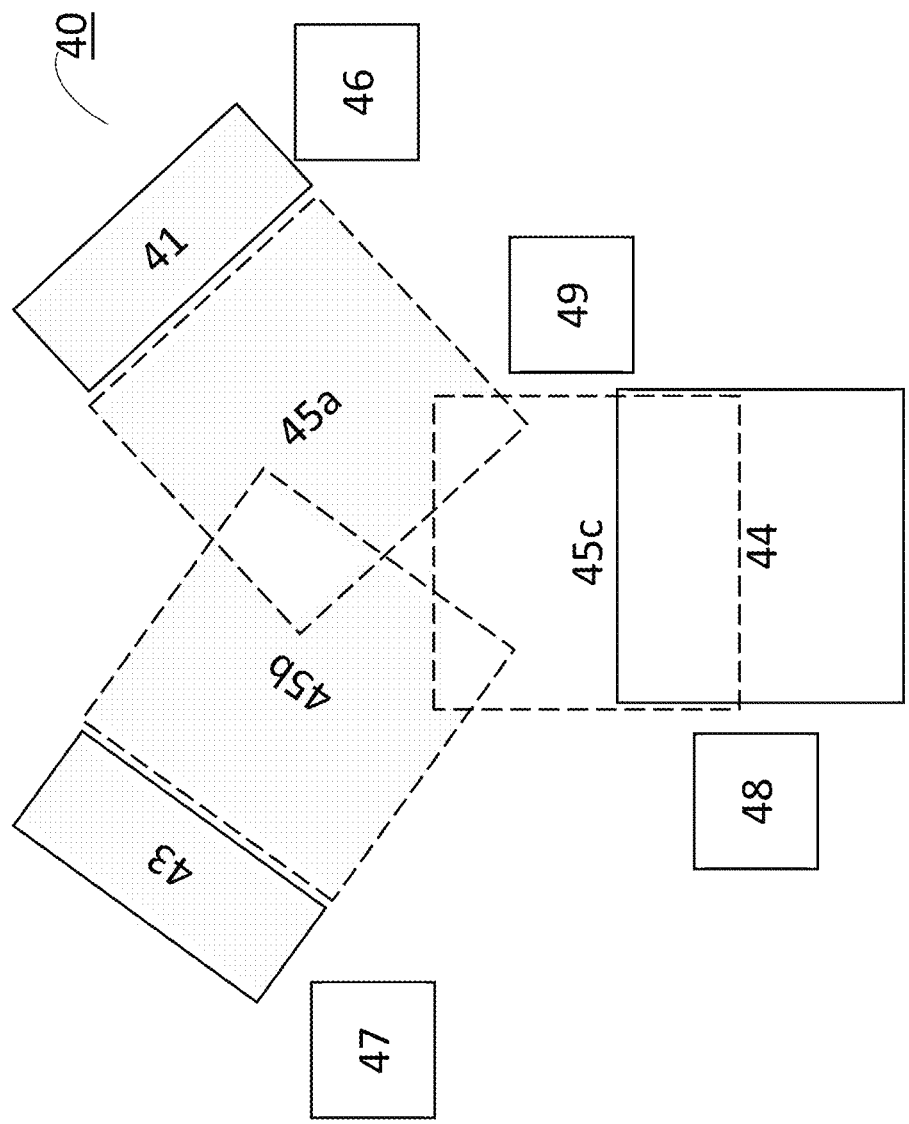
FIG. 2 presents a schematic illustration of an exemplary carousel printing machine, according to some embodiments of the present invention, wherein exemplary printing machine 40 comprises applicator 41 for applying an immobilizing composition on the surface of the substrate (not shown), printhead 43 for printing the dye-sublimation ink composition on the surface of the substrate, heat-press 44 in the exemplary form of a stationary flat heat-press for exerting heat and pressure to the substrate after applying the immobilizing composition and printing the ink composition thereon, and printing table assembly 45a for moving the substrate relative to applicator 41, printing table assembly 45b for moving the substrate relative to printhead 43 and printing table assembly 45c for moving the substrate relative to heat-press 44, wherein printing table assemblies 45a-45c represent different positions of the printing table assembly, and further comprises controller 46 for positioning and timing applicator 41, controller 47 for positioning and timing printhead 43, controller 48 for regulation of temperature, pressure and timing heat-press 44, and controller 49 for coordinating positioning of printing table assemblies 45a-45c.

FIG. 2 presents a schematic illustration of an exemplary carousel printing machine, according to some embodiments of the present invention, wherein exemplary printing machine 40 comprises applicator 41 for applying an immobilizing composition on the surface of the substrate (not shown), printhead 43 for printing the dye-sublimation ink composition on the surface of the substrate, heat-press 44 in the exemplary form of a stationary flat heat-press for exerting heat and pressure to the substrate after applying the immobilizing composition and printing the ink composition thereon, and printing table assembly 45a for moving the substrate relative to applicator 41, printing table assembly 45b for moving the substrate relative to printhead 43 and printing table assembly 45c for moving the substrate relative to heat-press 44, wherein printing table assemblies 45a-45c represent different positions of the printing table assembly, and further comprises controller 46 for positioning and timing applicator 41, controller 47 for positioning and timing printhead 43, controller 48 for regulation of temperature, pressure and timing heat-press 44, and controller 49 for coordinating positioning of printing table assemblies 45a-45c.

When printing machine 40 is in use, a substrate is placed on one of printing table assemblies 45a-45c, which go around the carousel and stop at stations as needed. At each station, the printing table assembly goes through the process being offered at that station. For example, in the case of the station of applicator 41, the substrate undergoes wetting by the immobilizing composition, and then the printing table assembly is moved onwards to the station of printhead 43 for printing the dye-sublimation ink composition while it is still wet from the immobilizing composition, and so on.

It is expected that during the life of a patent maturing from this application many relevant methods, uses and compositions will be developed and the scope of the terms methods, uses, compositions and polymers are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Dye-Sublimation Ink Composition

An exemplary dye-sublimation ink composition, adapted for direct inkjet printing on any substrate suitable for dye-sublimation, including untreated polyester fabrics and other absorptive fabrics, according to some embodiments of the present invention, is presented hereinbelow. This exemplary ink composition is formulated to contain a dispersed hydrophobic sublimable dye, and further formulated to congeal upon contacting an immobilizing composition, comprising an acid, on the surface of an untreated fabric.

The following is a general makeup of dye-sublimation ink composition, according to some embodiments of the present invention, listing the ingredients with amounts given in percent by weight of the total weight of the composition.

| | |
|---|---|
| Sublimable dye | 1-40% |
| Surfactant/dispersant* | 0.05-10% |
| Property-sensitive agent** | 1-30% |
| Humectant/wetting agent | 10-60% |
| Thickening agent | 0-10% |
| Deionized water QS | to100% |
| pH adjusted/buffered to | 7-13 |

*in some embodiments at least some of the amount of the surfactant/dispersant ingredient may be included in the amount of the sublimable dye ingredient;
**in some embodiments the property-sensitive agent ingredient is a surfactant/dispersant, and at least some of the amount of which may be included in the amount of the surfactant/dispersant ingredient and/or the amount of the sublimable dye ingredient.

The following is an exemplary dye-sublimation ink composition, according to some of embodiments of the present invention, wherein the sublimable dye is dispersed by a property-sensitive agent, which was prepared as follows:

| | |
|---|---|
| C.I. Disperse Red 60* (dispersed sublimable dye) | 15% |
| BYK 333 (surfactant) | 0.5% |
| Propylene glycol (humectant/wetting agent) | 30% |
| Glycerol (humectant/wetting agent) | 10% |
| PVP 40K (thickener) | 3% |
| Deionized water QS | to 100% |
| pH (adjusted by the sublimable dye) | 8.1 |

*C.I. Disperse Red 60 is a commercial product that comprises powderous 1-amino-4-hydroxy-2-phenoxyanthraquinone particles coated by an alkali-soluble resin being a property-sensitive agent. Commercial C.I. Disperse Red 60 includes about 23% of the dispersed sublimable dye therein An exemplary immobilizing composition comprising an acidic agent, according to some embodiments of the present invention, is presented hereinbelow. This immobilizing composition is formulated to effect immobilization by congelation of an acid-sensitive agent which forms a part of the dye-sublimation ink composition upon contact therebetween.

The following is a general makeup of an acid-containing immobilizing composition, according to some embodiments of the present invention, listing the ingredients with amounts given in percent by weight of the total weight of the composition.

| | |
|---|---|
| Acidic agent | 1-10% |
| Humectant | 10-40% |
| Thickening agent | 0-20% |
| Wetting agent/surfactant | 0-0.5% |
| Acticide ® MBS (antimicrobial agent) | 0-3% |
| Deionized water QS | to 100% |
| pH adjusted/buffered to | 2-6 |

The following is an exemplary acidic immobilizing composition, according to some of embodiments of the present invention, which was prepared as follows:

| | |
|---|---|
| Lactic Acid (acid) | 6% |
| Ammonium lactate (buffering agent) | 2% |
| Propylene glycol (humectant) | 68% |
| Acticide ® MBS (antimicrobial agent) | 1.2% |
| Deionized water QS | to 100% |
| pH | 4 |

These compositions were used in the following example to form images on untreated polyester fabric substrates.

Example 2

Printing Test

The following is an exemplary process using the above-described exemplary dye-sublimation ink composition and exemplary immobilizing composition, according to some embodiments of the present invention. It should be noted that this exemplary process is applicable for use in combination with other ink compositions and printing machines.

The exemplary printing process, according to embodiments of the present invention, was performed as follows:

A Promodoro Fashion GmbH Germany 3520 T-shirt (100% polyester) substrate was placed in a printing machine equipped with a plurality of printheads, Kornit™ Paradigm™ inkjet printing machine.

Two images of 1-square centimeter were printed on two areas of the substrate. In one image the ink composition was inkjetted directly on the untreated polyester fabric, and a second image was printed following an application of the immobilizing composition on the same area of the substrate, using a dedicated printhead. The printer substrate was subjected to heat in order to sublime the dye into the fabric, and the images were analyzed by digitally photographing the images and analyzing the color intensity on the digital photograph.

Figure 3:
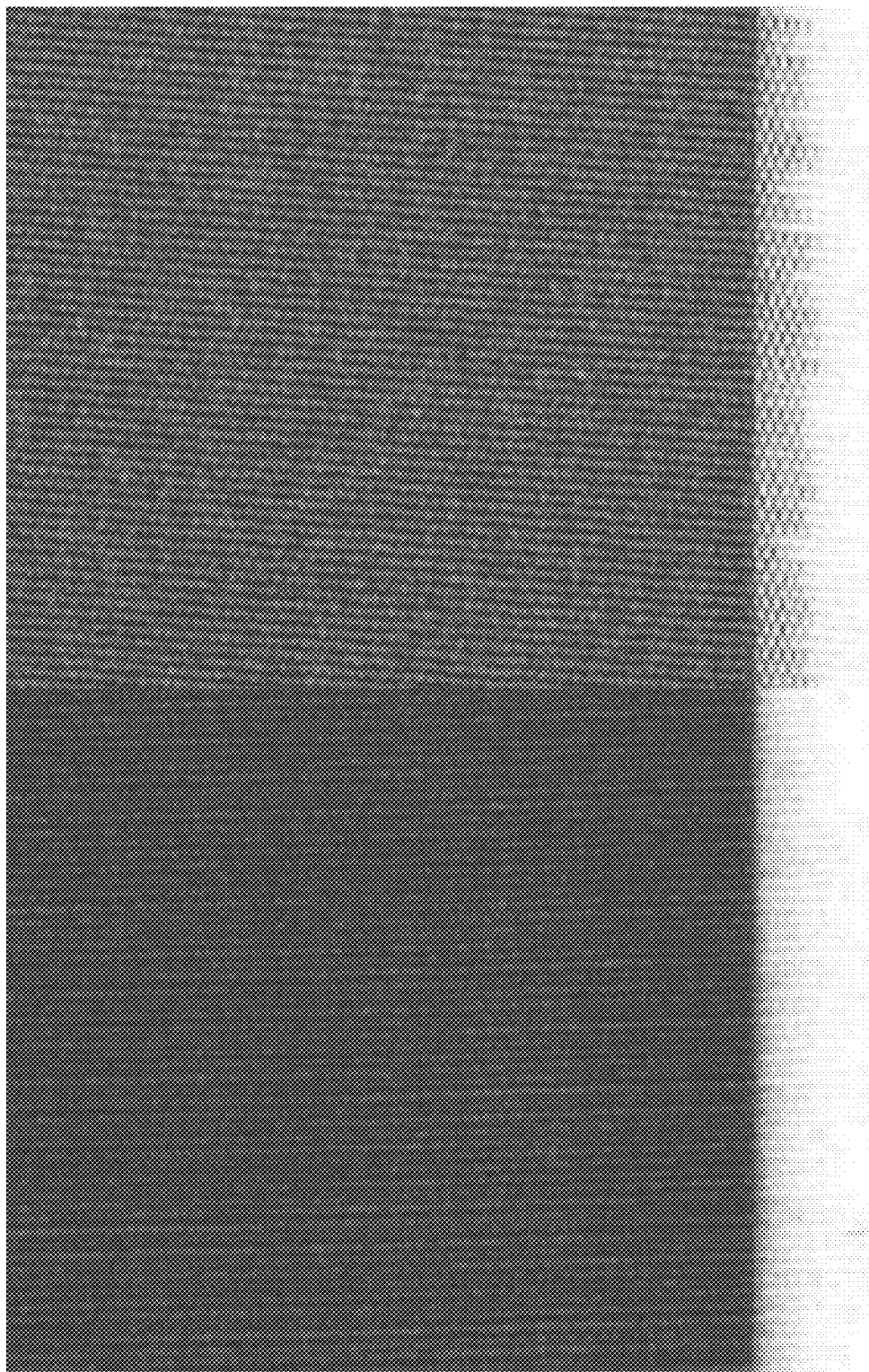
FIG. 3 presents a digital photograph of an edge of the substrate having thereon printed images, wherein the top part of the image showing the image printed without using an immobilizing composition, namely without coagulation of the ink composition prior to heating the substrate, and the bottom part of the image showing the image printed while using an immobilizing composition, namely with coagulation of the ink composition prior to heating the substrate.

FIG. 3 presents a digital photograph of an edge of the substrate having thereon printed images, wherein the top part of the image showing the image printed without using an immobilizing composition, namely without coagulation of the ink composition prior to heating the substrate, and the bottom part of the image showing the image printed while using an immobilizing composition, namely with coagulation of the ink composition prior to heating the substrate.

As can be seen in FIG. 3, the color intensity of the top part of the figure is notably lower than the color intensity of the bottom part of the image, indicating that at least some of the sublimable dye penetrated deep into the fabric, whereas the color intensity of the image printed with coagulation of the ink composition is notably stronger, indicating that most of the dye remained atop the surface of the substrate. As can further be seen in FIG. 3, the color intensity near the edge of the image feathers gradually in the top part of the figure, while in the bottom part of the image the edge is sharper and well defined, indicative of lesser soaking of the dye into the fabric, leading to lower degree of feathering of the image into the background.

The printed images, shown in FIG. 3, where analyzed using the image analysis software ImageJ [Schneider, C A. et al, *Nature methods*, 2012, 9(7), pp. 671-675]. The analysis was conducted on a high resolution scan of the images, sampling a rectangular area encompassing 1 cm over 2.7 cm of each of the images, stating 1.4 cm from the edge of the image (printed area) and continuing outside the image into the unprinted (white) area; the results are shown in FIG. 4.

Figure 4:
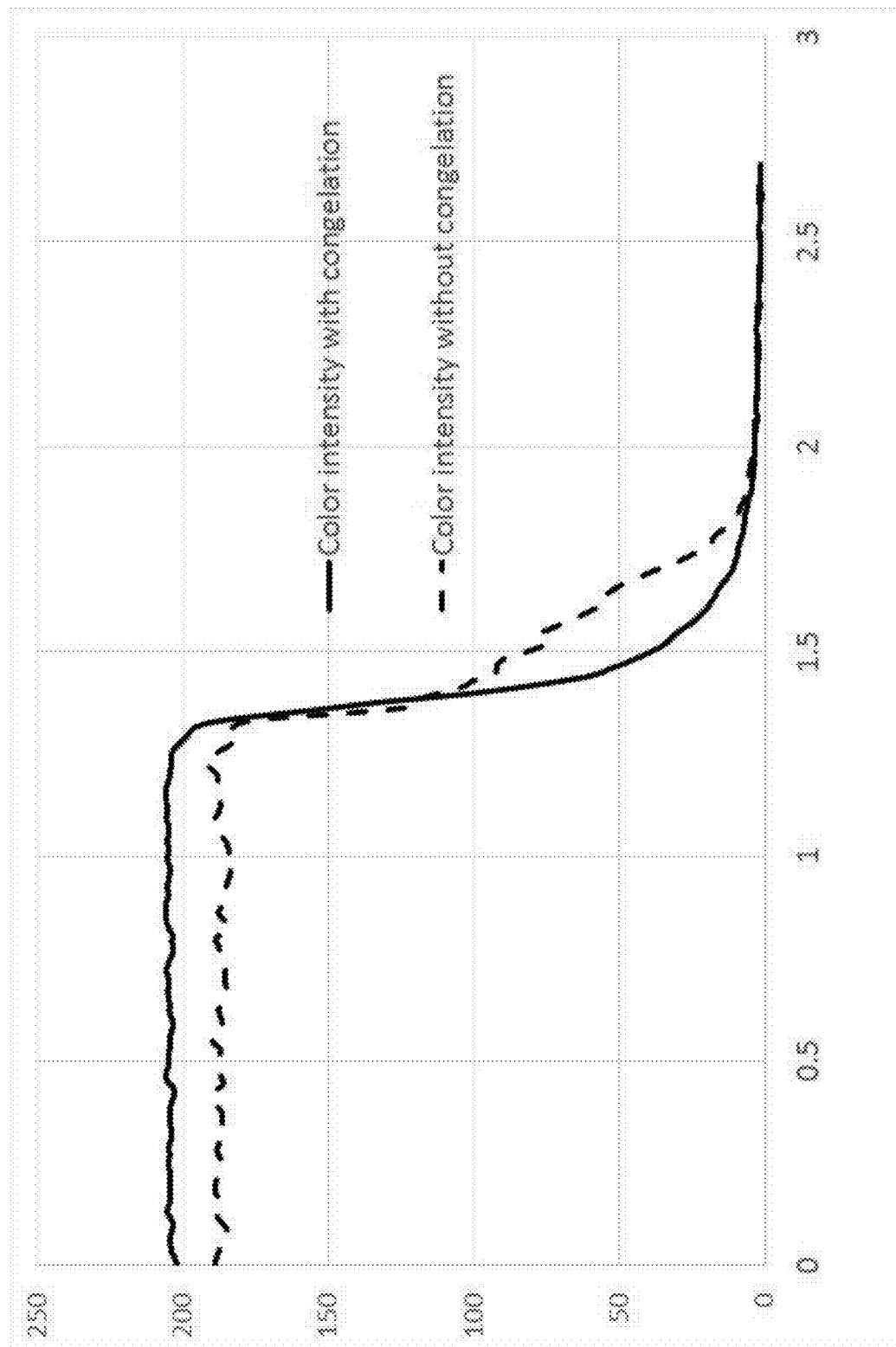
FIG. 4 is a comparative plot showing the color intensity of the image printed with coagulation of the dye-sublimation ink composition (solid line) and the color intensity of the image printed without coagulation of the ink composition (dashed line), wherein the color intensity is measured as a function of the distance from an arbitrary point near the center of the image and continues into the unprinted area of the substrate.

FIG. 4 is a comparative plot showing the color intensity of the image printed with coagulation of the dye-sublimation ink composition (solid line) and the color intensity of the image printed without coagulation of the ink composition (dashed line), wherein the color intensity is measured as a function of the distance from an arbitrary point near the center of the image and continues into the unprinted area of the substrate.

As can be seen in FIG. 4, the color intensity of the image printed with coagulation of the ink is higher in the printed area and drops sharply to the minimal intensity, whereas the color intensity of the image printed without coagulation of the ink composition is lower at the printed area, and fades gradually into the background, indicating feathering caused by absorption of the ink into the fabric. The difference in color intensity between the image printed with ink coagulation and the image printed without ink coagulation was 27% less for the latter, indicating that some of the sublimable dye have migrated by soaking at the liquid state before heat was applied, thus some of it was transferred to inner unseeable depths of the substrate.

A color intensity analysis based on the front (printed) side and back side of the substrate was carried out by a spectral color measurement using i1Basic Pro 2 by X-Rite, U.S.A. The analysis has determined that the difference in color intensity between the back and the front sides of the fabric is 76% for the image printed with coagulation of the ink composition, compared with a 51% difference for the image printed without coagulation of the ink, indicating that the coagulated ink has stayed essentially atop the surface of the fabric until heat was applied to effect dye sublimation, which the uncoagulated ink soaked deep into the fabric before the sublimation step took place, allowing the ink to dye the fabric also at the back side thereof.

Example 3

Ink Immobilization Effect

Without being bound by any particular theory, it is believed that the immobilizing composition forms a layer between the dye-receiving fibers in the substrate and the dye in the droplets of the colored composition(s). This later causes the droplets to "freeze" on the spot of their landing without feathering or soaking into the fabric, which is a desired effect; however, the layer may also interfere with the passage of dye into the fibers, or cause the fibers at the top of the surface of the substrate to receive an amount of due that is not stable and may be lost during washing.

The following example was conducted to study the effect of the amount of immobilizing composition and the colored composition(s) printing density on the final result in terms of color gamut and stability in wash-fastness test.

The substrate was a 100% polyester t-shirt by Promodoro Fashion GmbH Germany 3250-06. The printing resolution was 600 DPI, using a Storm Hexa printing machine by Kornit LTD, equipped with 15 pl printheads for the colored ink compositions, and 35 pl printheads for the immobilizing composition.

The immobilizing composition presented in the previous example was applied (printed) on the surface of the substrate at four different coverage densities, namely 25% surface coverage, 50%, 75 & and 100% coverage of the immobilizing composition as a continuous and uniform layer. The colored ink composition was printed at a coverage density from 0% to 100% in 5% increments. Final color density was measured by i1 Pro spectrophotometer by X-Rite.

The results of the response of color density to percent coverage of the immobilizing composition are presented in Table 1 below.

TABLE 1

| % coverage | C | M | Y | K |
|---|---|---|---|---|
| 100 | 1.385 | 1.396 | 1.552 | 1.426 |
| 75 | 1.373 | 1.416 | 1.535 | 1.42 |
| 50 | 1.395 | 1.429 | 1.555 | 1.451 |
| 25 | 1.351 | 1.395 | 1.533 | 1.404 |

As can be seen in Table 1, the best results were achieve at 50% coverage on the immobilizing composition on the substrate.

The color fastness test was conducted on 100% solid color prints, printed at 600 dpi 15 pL printheads over 25% and 75% coverage of the immobilizing composition, applied by 35 pL printhead on a 100% polyester t-shirt (Promodoro Fashion GmbH Germany 3250-06). The crock fastness was done by standard ISO 105X12, and analyzed by i1 Pro spectrophotometer (X-Rite).

TABLE 2

| Time (sec) | temp (° C.) | 25% coverage | 75% coverage |
|---|---|---|---|
| 30 | 180 | 2.125 | 3.25 |
| 30 | 200 | 2.75 | 3.5 |
| 60 | 180 | 2.875 | 3.5 |
| 60 | 200 | 3.5 | 4.25 |

As can be seen in Table 2, color fastness also depends on the amount, or percent coverage of the immobilizing composition, up to an improvement of 1.125 unit of the fastness leading to the conclusion that optimizing the amount of immobilizing composition affords improved fastness.

These experiments established that in the case of direct inkjet printing of sublimable dye ink compositions, printing quality and fastness depend on the amount of immobilizing composition applied on the substrate, unlike in the case of other colorants in inkjet ink compositions, such as dispersed pigments, where the dominant effect is immobilization prior to curing.

Here it was found that in any given printing conditions, the amount of immobilizing composition plays an additional role beside immobilization. In this example it was found that for optimal printing quality and fastness, the density of the immobilizing composition should be set to 50% surface coverage.

It was further found that if no immobilizing composition is used, there is notable gamut clipping in the shadows region.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process of direct inkjet printing an image on an absorptive substrate using a dye-sublimation ink composition, comprising contacting at least a portion of the substrate with an immobilizing composition, printing the dye-sublimation ink composition directly on said portion of the substrate, and heating the substrate to thereby form the image on the surface of the substrate, wherein:

said substrate comprises fibers suitable for dye-sublimation printing;

said ink composition comprises a sublimable dye, a property-sensitive agent and a carrier, and said immobilizing composition comprises a property-adjusting agent and a carrier, said ink composition is formulated to coagulate on said portion of the substrate upon contacting said immobilizing composition, thereby substantially preventing said dye-sublimation ink composition from soaking into the absorptive substrate, said dye-sublimation ink composition is essentially devoid of a film-forming agent, said immobilizing composition and said ink composition are each individually applied digitally on said portion of the substrate by a separate applicator selected from the group consisting of a nozzle and a printhead, and said ink composition is applied on said substrate while said substrate is still wet with said immobilizing composition.

2. The process of claim 1, wherein said property-sensitive agent is an alkali-soluble agent.

3. The process of claim 1, wherein said property-adjusting agent is selected from the group consisting of an acid, a metal oxide and a divalent metal cation.

4. The process of claim 1, wherein said immobilizing composition and/or said ink composition are each formulated for application from a printhead and characterized by at least one of:

a maximal particle size of less than 1 microns;

a dynamic viscosity at shear that ranges from 2 to 25 centipoises;

a printing temperature Brookfield viscosity less than 25 centipoises;

a surface tension that ranges from 24 to 32 mN/m; and an electrical resistance of 50 to 2000 ohm per centimeter.

5. The process of claim 1, wherein said immobilizing composition is formulated for application from a nozzle and characterized by at least one of:

a maximal particle size of less than 100 micron;

a dynamic viscosity at shear that ranges from 2 to 400 centipoises;

a room temperature Brookfield viscosity less than 400 centipoises;

a surface tension that ranges from 15 to 70 mN/m; and an electrical resistance of 50 to 2000 ohm per centimeter.

6. The process of claim 1, wherein said immobilizing composition and said ink composition are each individually applied digitally on said portion of the substrate concomitantly within a time period that ranges from 0.01 seconds to 15 minutes.

7. The process of claim 1, wherein said heating is effected to a temperature that ranges from 140 to 220° C.

8. The process of claim 1, wherein the substrate is an untreated substrate.

9. The process of claim 1, wherein the substrate is devoid of said property-adjusting agent prior to said contacting.

* * * * *